March 15, 1960     J. A. RAJCHMAN     2,928,894
ELECTRICAL DISPLAY DEVICE
Filed May 31, 1955     14 Sheets-Sheet 1

INVENTOR.
JAN A. RAJCHMAN
BY
ATTORNEY

BLOCKED STATE

UNBLOCKED STATE

INVENTOR.
JAN A. RAJCHMAN
BY
ATTORNEY

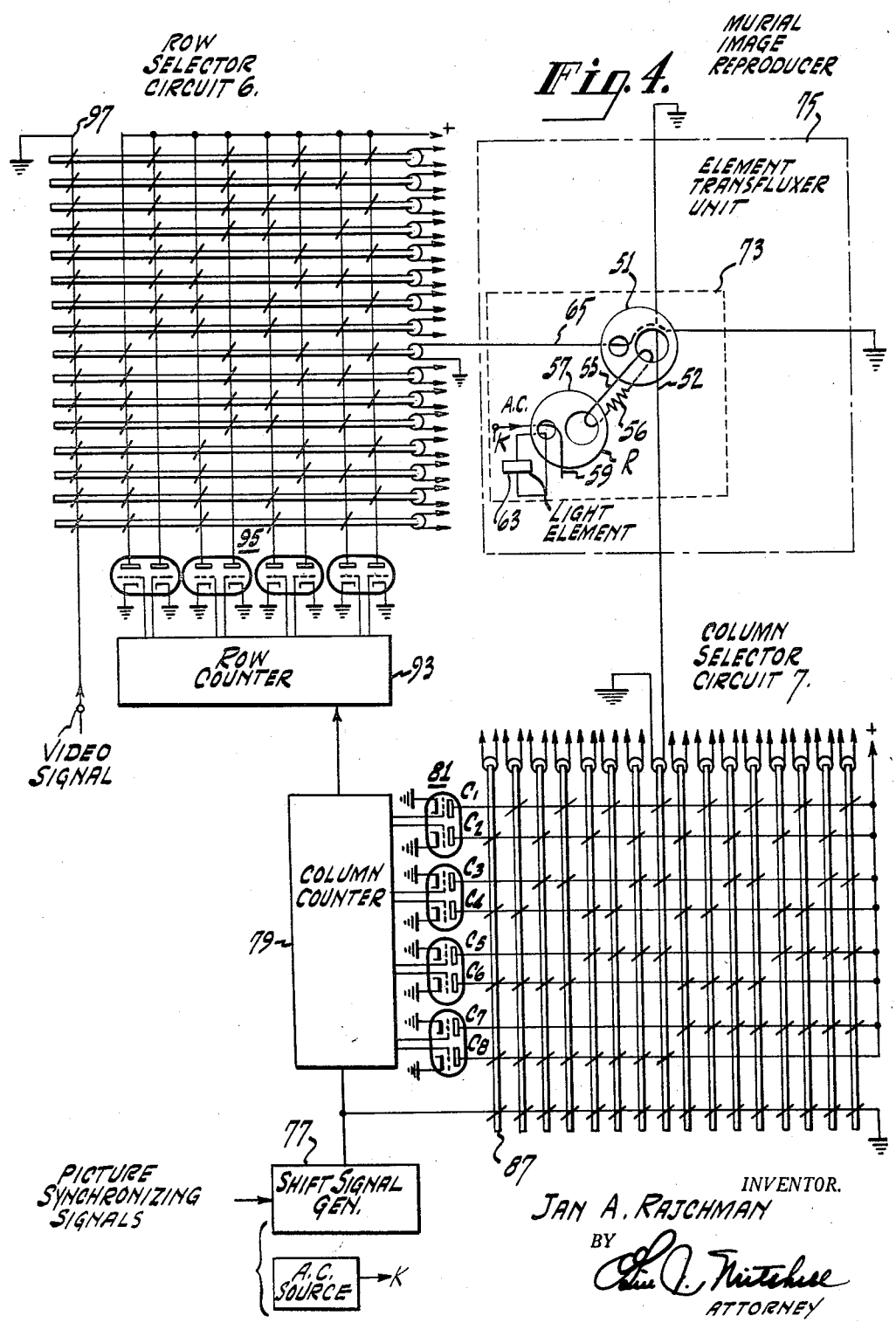

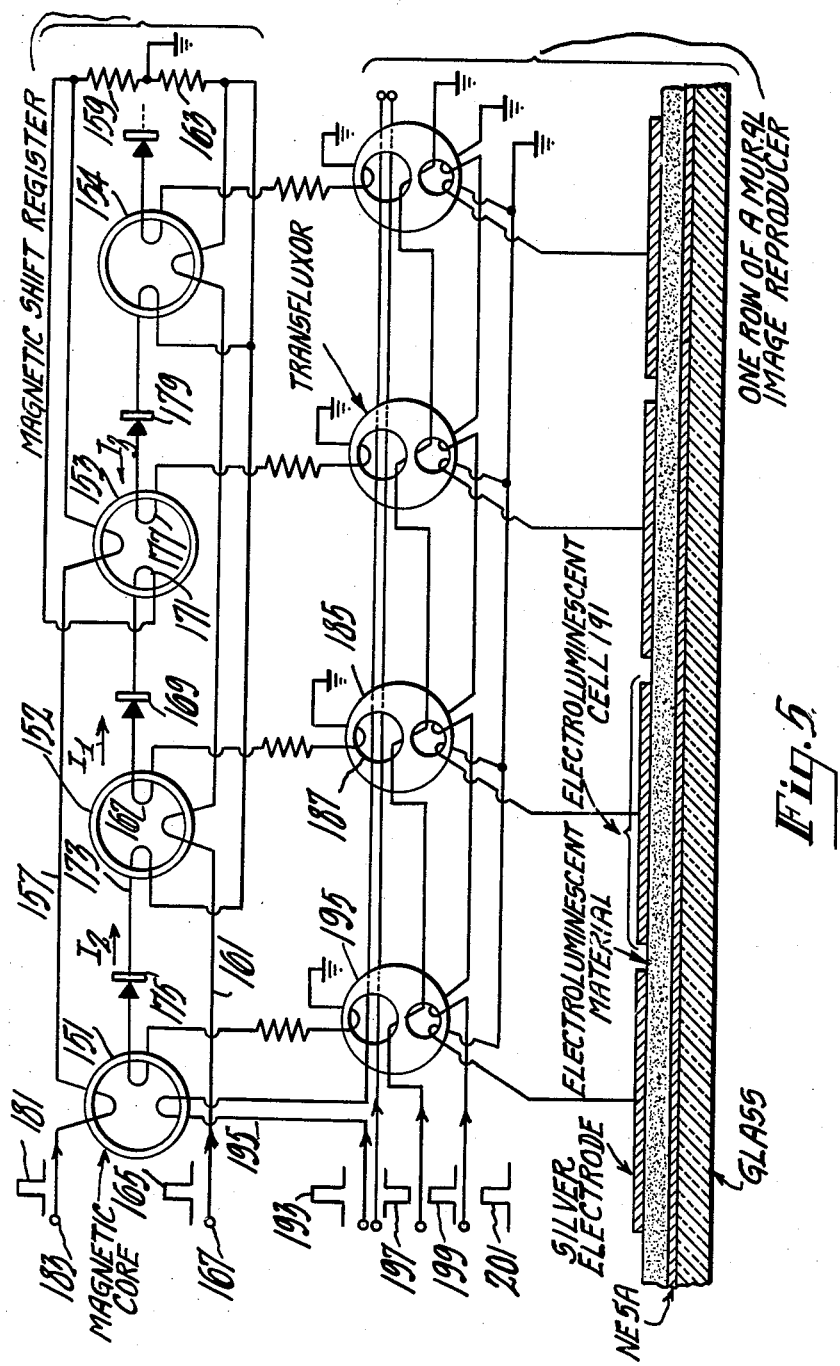

INVENTOR.
JAN A. RAJCHMAN
BY
ATTORNEY

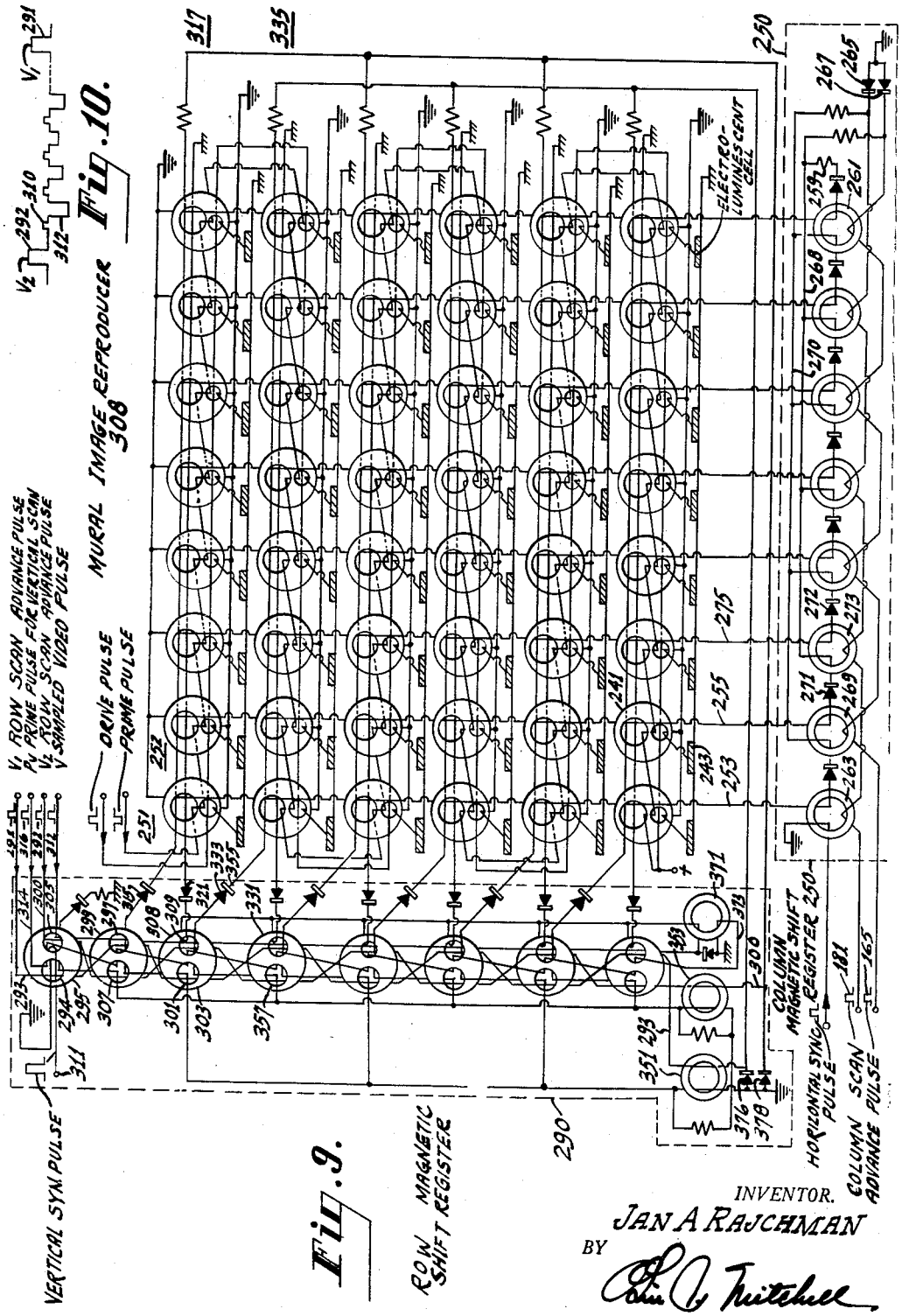

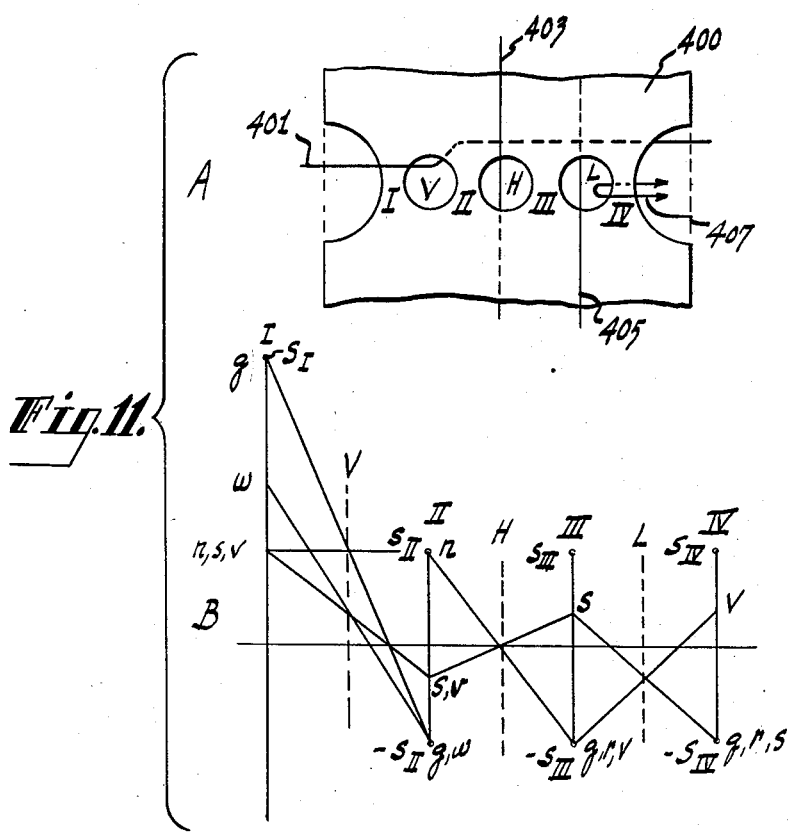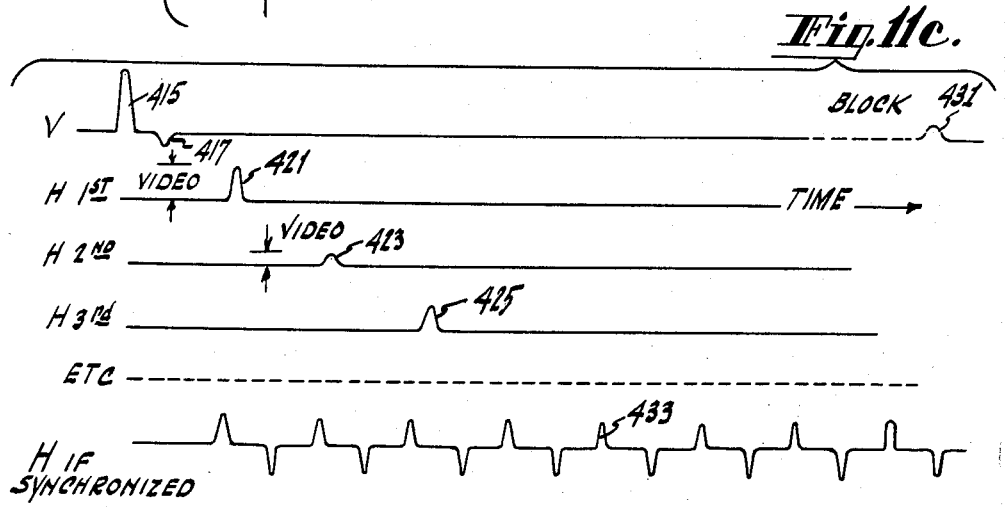

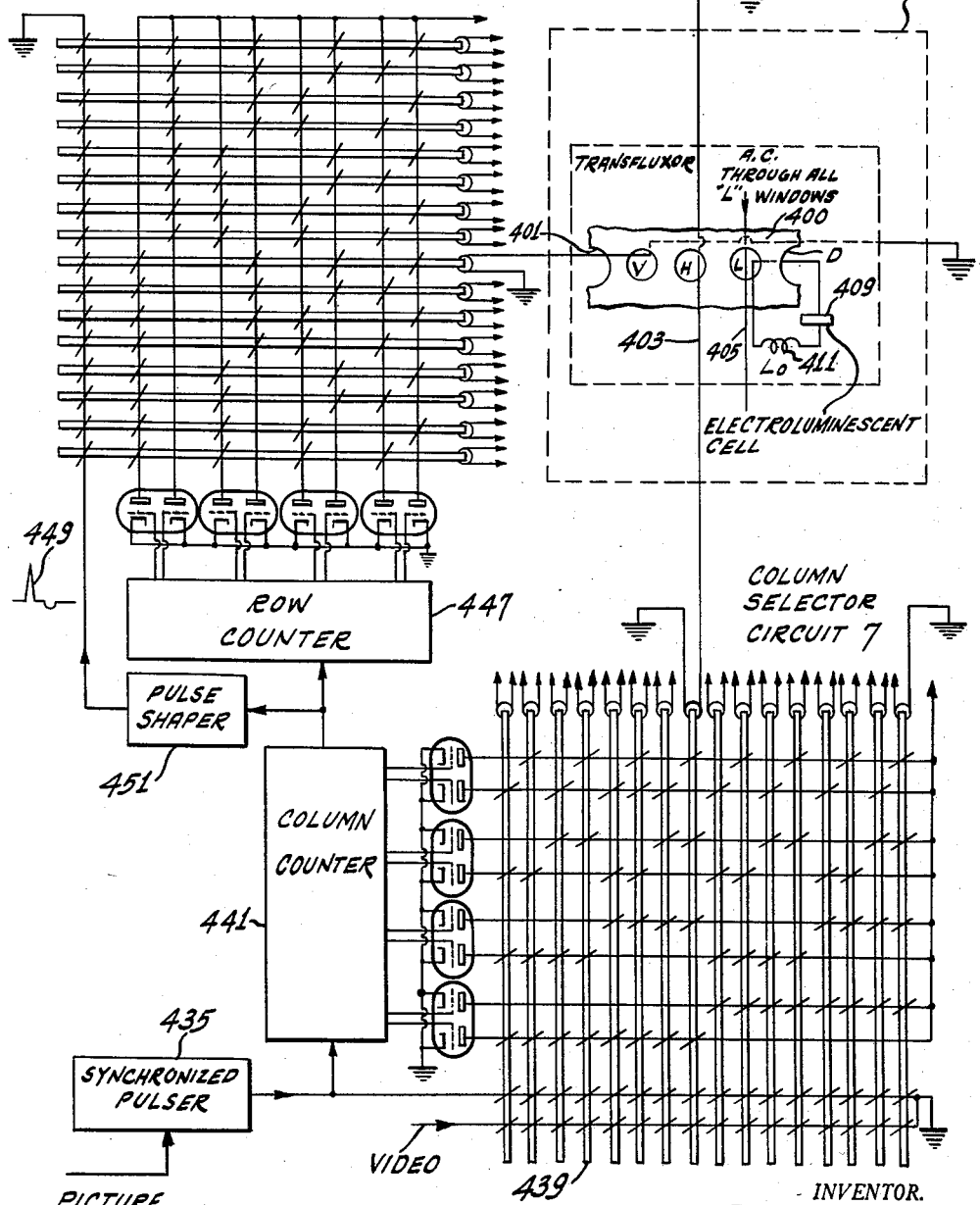

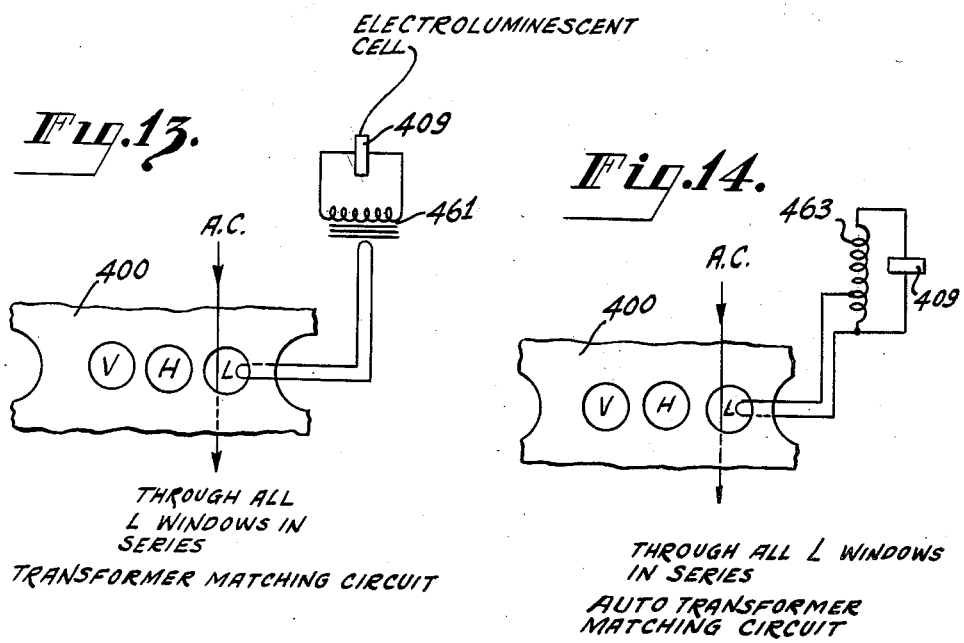
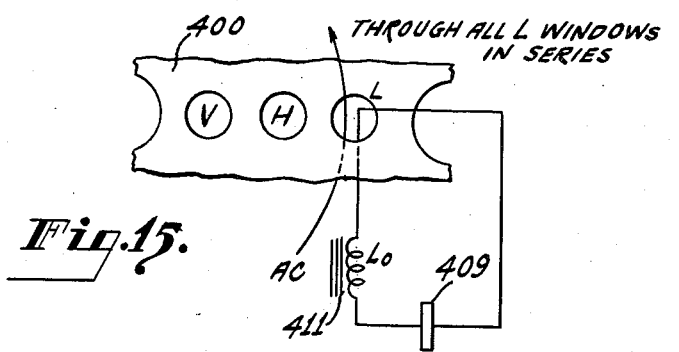

NOTE:
E.L. = ELECTROLUMINESCENT CELL

INVENTOR.
JAN A. RAJCHMAN
BY
ATTORNEY

March 15, 1960 J. A. RAJCHMAN 2,928,894
ELECTRICAL DISPLAY DEVICE
Filed May 31, 1955 14 Sheets-Sheet 14

INVENTOR.
JAN A. RAJCHMAN
BY
ATTORNEY

United States Patent Office 2,928,894
Patented Mar. 15, 1960

2,928,894

ELECTRICAL DISPLAY DEVICE

Jan Aleksander Rajchman, Princeton, N.J., assignor to Radio Corporation of America, a corporation of Delaware Application May 31, 1955, Serial No. 511,848

19 Claims. (Cl. 178—5.4)

The present invention relates to electrical display devices for displaying luminous or visible patterns in accordance with modulated electrical signals.

The electrical display device, according to the present invention, employs a novel arrangement including a matrix or array of elemental light emitting areas; such an electrical display device will be variously referred to hereinafter as a mural image reproducer.

Mural image reproducers are useful in many systems in the communications art. One important use of the mural image reproducer is for television signal reproduction; a mural image reproducer performs all the functions presently performed by the cathode ray kinescope and will perform many of these functions in a far more efficient fashion particularly with respect to faithful geometric reproduction without distortion due to non-linear scanning. In addition, a mural image reproducer using structure to store the last electrical signals may be caused to display indefinitely the last applied picture. The actual storage requires no holding power, and a latent picture can be stored in dead storage for any length of time. Subsequently it can be viewed indefinitely by providing the light producing power. For example, a television scene can be "arrested" at any time and a "still" picture produced at will. Also, various proposed television systems employing narrow bandwidths, lower frame rate, multiplexing, coded transmission, or with noise reduction—all depending on storage—are made practical.

The electrical display device, according to the present invention, is applicable for use in many applications outside of the television field. Among these applications are the display and storage of radar information, computer display application, for example, the displaying of coded information in terms of trains of pulses as typically encountered in digital computers. The present invention may also be utilized for displaying visual representation of characters, letters, and numerals expressing, for example, the output of a business type electric digital computer.

The electrical display device according to the present invention utilizes devices which combine the functions of switching, storage and luminosity control which (A) store the signal indicative of the light to be reproduced at each elemental area, (B) are responsive to signals indicative of the location of the elemental area, and (C) which control energy in accordance with the stored signal to control the light output of light emitting means corresponding to that elemental area.

It is an object of this invention to provide an improved type of electrical display devices.

It is another object of this invention to provide an image reproducer which is suitable for displaying images of large size with improved scanning linearity.

It is another object of this invention to provide an improved electrical display device which may be utilized for the storage of images for efficient utilization of the image reproducing media.

It is another object of this invention to provide an electrical display device which does not require an evacuated envelope, which eliminates the need for a scanning beam and which does not require focusing; in television applications, the electrical display device may be made flat.

It is an object of this invention to provide means for image reproduction utilizing switching and storage devices.

According to the invention, a control device is associated with each of a plurality of elemental luminiferous devices in an electrical display device. Each device corresponding to an elemental area is responsive to a particular sequence of signals relating to the location of the elemental area and to the image or pattern information to be accorded that elemental area so that the overall image display device will store and reproduce a visible pattern or image in accordance with an applied pattern or image intelligence signal.

In one form of the invention, the control devices may be caused to store information corresponding to image or pattern information corresponding to each elemental area for prescribed intervals of time.

In an electrical display system of the invention, for reproducing television images from a television signal, electroluminescent elemental areas are controlled by transfluxors to provide reconstruction of the televised image. Moreover, a color image may be reproduced by a mural image reproducer by subdividing each elemental luminiferous area into groups of sub-elemental luminiferous areas, each sub-elemental area corresponding to a suitable primary color and energized according to the signal level relating to that primary color at that elemental area.

Other objects of this invention will be explained in detail in the following specification and in the accompanying drawings in which:

Figure 4 shows a mural image reproducer and associated switching circuits wherein a two-transfluxor switching and control circuit is utilized at each picture element.

Figure 5 shows a circuit of a magnetic shift register controlling a portion of one line of a mural image reproducer screen.

Figure 9 shows the circuit details of a mural image reproducer with its associated switching and control circuits.

Figure 10 shows a sequence of pulses bearing switching, priming and video information which are applied to the vertical magnetic shift register of Figure 9.

Figure 11A shows a three-hole transfluxor.

Figure 11B shows a flux diagram associated with the transfluxor of Figure 3A.

Figure 11C shows a sequence of energizing, blocking and video information bearing pulses suitable for driving the transfluxor of Figure 13A.

Figure 12 shows a mural image reproducer system which utilizes a three-hole transfluxor at each elemental area.

Figures 13, 14 and 15 show various circuit means for matching the output winding of a transfluxor to an electroluminescent cell.

A mural image reproducer using luminiferous cells

In one form of the present invention, luminiferous cells are arranged in rows and columns. It is to be understood that luminiferous cells are cells which are either actively transmitting, producing, or yielding light or are capable of transmitting, producing, or yielding light, and are cells whose light output is controllable. Various types of luminiferous cells, such as light cells, electroluminescent cells, light valves, or devices of controllable optical transmission, will be discussed in the specification to follow. Switching, storage and control devices are provided, each responsive to information relating to row and column information and to image or pattern information, for controlling the light output of each of the luminiferous cells to cause the aggregate of luminiferous cells to reproduce the image or pattern corresponding to that information.

Figure 1:
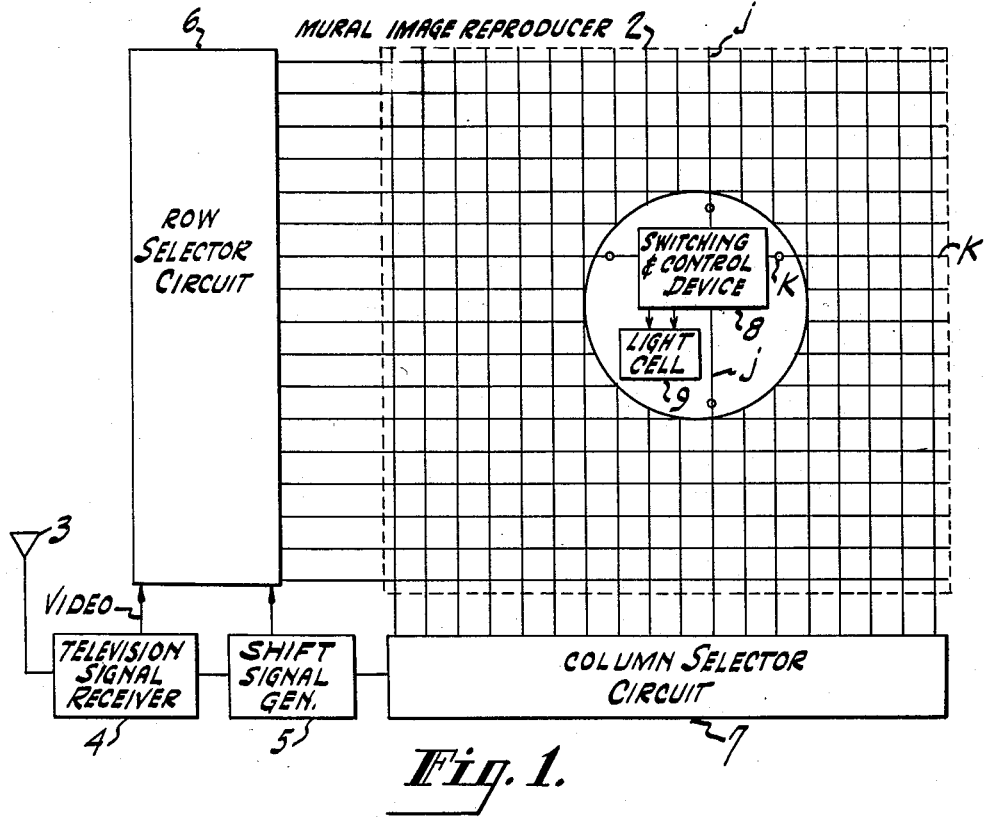
Figure 1 is a diagram of a mural image reproducer television receiver circuit.

Figure 1 shows a diagram of a mural image reproducer 2 as a component of a television receiver. The mural image reproducer 2 includes the rows and columns conductors each illustrated by a single line emanating from the row selector circuit 6 and the column selector circuit 7 respectively; at the contiguous intersection of each row and column conductor, a light cell 9 is installed. Other conductors for supplying, for example, power, may also be included in the image reproducer 2.

The incoming television signal arrives at the antenna 3 and is applied to the television signal receiver 4. In the television signal receiver 4, the television signal information received, is demodulated to provide a video signal and synchronizing signals. The synchronizing signals are then applied to a shift signal generator 5 which actuates the column selector circuit 7 and the row selector circuit 6 to control the shifting of video and control signals from one column conductor to another and from one row conductor to another. In the form of the invention illustrated in Figure 1, the video information is passed to the row selector circuit 6. The row selector circuit 6 and the column selector circuit 7 energize the respective conductors of the mural image reproducer 2 in a sequence and a rate characteristic of the television signal being received. For example, utilizing a television signal conforming to U.S. standards, the row and column selector circuits 6 and 7 may select typically in the neighborhood of 500 lines and 700 rows.

At the intersection of, for example, the row conductor $k$ and the column conductor $j$, a switching and luminosity control device 8 of the present invention such as a transfluxor, to be described, is installed. This switching and luminosity control device 8 is responsive to the coincidence of information supplied to both row conductor $k$ and column conductor $j$ and to the video information corresponding to the video intelligence to be reproduced at the light cell 9 corresponding to the intersection of these conductors.

In television applications, each switching and control device 8 may be caused to function as a storage device so that the light cell will maintain the light output, for example, from one frame to the next when the switching and control device 8 will again be energized according to the video information corresponding to this intersection. The switching and control device 8 then controls the light output from the light cell 9 in accordance with this video information.

In mural image reproducers of the present invention which employ the aforementioned function of storage, flicker is greatly reduced. In addition, the image or pattern is reproduced in a far more efficient fashion since a scanning system which does not utilize storage of information between successive excitation of each elemental area requires very large instantaneous light output to produce a picture of usable brightness to a human observer.

The video information is supplied to the row selector circuit 6 which not only controls the row selection but also supplies the video information to the column selected. As the alternative to the above, the video intelligence is supplied to the column selector circuit 7 with the video intelligence thereupon successively transmitted to each intersection along a row as the columns are sequentially selected by the column selector circuit 7.

In a mural image reproducer of the present invention, power is provided from an active source and is available at every point in amounts controlled by the signal information; if the function of storage is provided by the switching and control device and the power is available continuously, the storage is of information and not of energy. This allows the use of such a relatively inefficient light source as electroluminescent material which would be very dim if excited only at the instants of scanning as would be the case without the benefit of storage.

Electroluminescent cells

The direct conversion of electrical energy into luminance within a solid provides a fundamentally attractive method for producing light over large areas. The providing of luminance by the application of electric potential to certain crystalline phosphors is called electroluminescence. With proper materials, electroluminescence provides a means of producing light in a very efficient manner. Typical electroluminescent cells utilizing present day techniques employ powdered phosphors of zinc sulphide and zinc sulfoselinide to mention only two of the materials possible. The microcrystalline grains of the phosphor are mixed with a plastic liquid material. The mixture is then sprayed on a piece of plate glass that has a transparent conducting surface on the side in contact with the plastic to form a layer of the order of 1000th of an inch thick. This plastic layer is backed by a layer of aluminum or silver or any other suitable metal after it has become set. The metal layer is made in the form of an array of separate electrodes, one for each element. These techniques make feasible large-area-electroluminescent panels. Mural image reproducers functioning according to the present invention and utilizing elemental electroluminescent cells may be constructed to be unlimited in size and total area.

A typical zinc sulphide electroluminescent cell has a surface brightness of about one foot lambert when excited by 110 v. and 60 cycles. At a higher voltage and 5 kcs. a similar cell will provide a brightness of over 50 foot lamberts. This is more than the brightness which is required for television application since 25 foot lamberts of brightness is usually seen in a well lighted room.

Transhysteretic devices

The present invention utilizes a new type of switching, storage and control device, namely a transhysteretic device, though not exclusively, which performs "transhysteretic action" which provides for the control of electrical energy from one part to another part of an aggregate of materials when the parts are distinct and characterized by hysteretic relationships between a physical quantity which is characteristic of each of the aggregates of materials involved and associated driving forces. An understanding of the concepts associated with "transhysteretic action" and hysteretic relationships is provided by the following:

There is a "hysteretic" relationship between a dependent variable $y$ and an independent variable $x$ (or "force") characterizing a material when the value of the dependent variable $y$ depends not only on the existing value of the independent variable $x$ but also on the previous history of the variations of the independent variable. In general, the dependent variable $y$ can have many different values for any one value of the independent variable.

When the independent variable $x$ oscillates back and forth (without reversing its rate change within one oscillation) between two extreme values, the variation of the dependent variable $y$, can be represented by a closed loop on the $x$—$y$ plane. This loop is called a hysteresis loop. In general, when the independent variable $x$ becomes zero, the dependent variable $y$ has a non-zero value, a remanent value. Symmetrical loops possess two equal and opposite remanent values. The value of the independent variable $x$ for which the dependent variable is zero is called "coercive force."

If $y$ reaches a stationary value for indefinitely large values of $x$, there is saturation. Of particular importance in the present invention are materials wherein the hysteresis loops have remanent values substantially equal to the saturated values. These loops are very often (though not necessarily) rectangular.

For increasing amplitude of oscillation of the dependent variable, increasingly large symmetrical hysteretic lops are obtained.

The best known hysteretic relationship is that for ferromagnetic materials where $x$ is either the magnetic induction B or the magnetic flux through a certain area such as that of the cross section of a core, rather than the magnetic induction and $y$ is the magnetizing force H.

There are some dielectric materials which also exhibit hysteresis phenomena. In this case it is the electric polarization P as a function of the electric field E. On a cell made of such material, it is convenient to consider the charge Q which has flown through the cell as a function of the voltage V that has been applied to it over a time interval. The dielectrics with hysteresis are called "ferroelectrics."

In a transhysteretic device there are distinct circuits for the flow of the physical quantity which has hysteretic properties, e.g., such circuits may be found in magnetic cores with multiple apertures or circuits with many ferroelectric cells. Let there be at least three distinct branches in the circuit, e.g., legs of the magnetic core or ferroelectric cells. "Transhysteretic action" is obtained when the amount of the hysteretic quantity, magnetic flux or electrical charge, is transferred back-and-forth in a steady state between two branches of the circuit as a result of a sustained alternating driving force on one or both of them according to a controllable value which is determined by a single pulse of driving force applied to a third branch. In the case of a magnetic core, the driving force is the magnetomotive force; in the case of a ferroelectric cell, the driving force is the voltage.

A transhysteretic device is comprised of passive solid state elements which can be defined operationally as follows. The device transmits electric energy from a source of A.-C. power to a load so that the degree of transmission is determined by a setting, established by a single pulse, which remains stored within the device. This setting remains unchanged until changed by another setting pulse. The setting remains stored whether the A.-C. power is present or not.

The transfluxor

A transhysteretic device utilizing the aforementioned magnetic materials is referred to as a transfluxor.

Briefly, a transfluxor, referred to above, is a device of magnetic material saturated at remanence; this material having two or more apertures defining closed flux paths which may be taken around one or more of these apertures. A pulsed magnetizing force around one of the apertures, which is determined by a current through that aperture will produce a remanent condition. The remanent condition will determine the amount of flux interchangeable along another flux path. If an energy source and a load are inductively coupled by way of the latter mentioned flux path, the amount of interchange of flux will determine the control of coupling between the energy source and the load. This type of control is utilized in the present invention to provide continuous or "half tone," control of the output power over a wide range.

Another type of transhysteretic device which may be used in accordance with the present invention is the transcharger—a ferroelectric device wherein the remanent charge and the coercive voltage form the parameter characteristic of the material and the driving force respectively.

In the detailed embodiment of the present invention transfluxors are employed, and their operation will be briefly stated hereinafter to aid in understanding of the present invention.

Figure 2A:
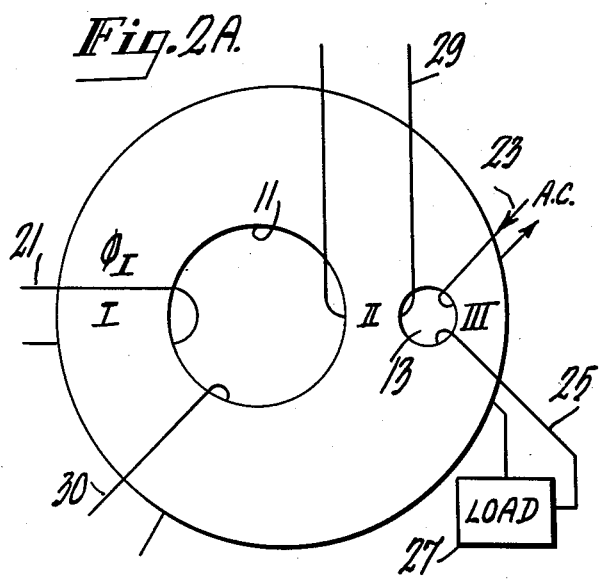
Figure 2A shows a two-hole transfluxor including actuating windings and load.
Figure 2B:
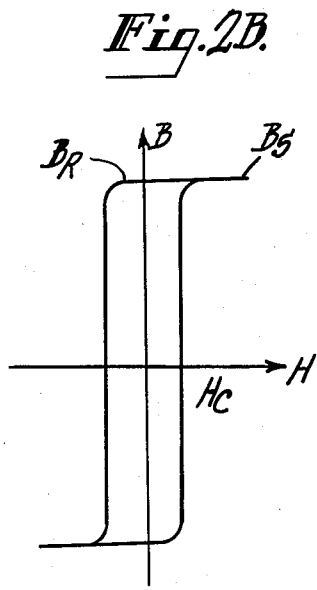
Figure 2B shows a hysteresis curve associated with the transfluxor shown in Figure 2A.
Figure 2C:
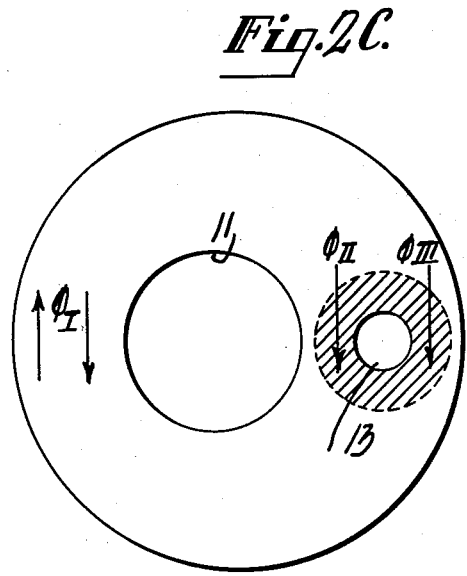
Figures 2C and 2D show flux states of the transfluxor of Figure 2A.

Consider one of the simplest types of transfluxors shown in Figure 2A which is formed of a magnetic material such as a molded ceramic ferro-spinel or "ferrite" which has a rectangular hysteresis loop and consequently a remanent induction $B_r$ substantially equal to the saturated induction $B_s$ as illustrated in Fig. 2B. The transfluxor shown in Figure 2A has two holes 11 and 13 which are preferably of unequal diameter. The cross-sectional areas of the legs II and III (taken along an axis through the centers of holes 11 and 13) which flank the smaller hole 13 are substantially equal and their sum is smaller than the area of leg I. Windings 21 and 30 each pass through hole 11; winding 29 passes through both holes 11 and 13; winding 23 supplies alternating current through hole 13 and winding 25 couples hole 13 to the load 27. The use of the windings 21, 29 and 30 will be described in detail in the following text. One method of operation of the transfluxor is described as follows. Assume that an intense current pulse is sent through the winding 21 in a direction to produce clockwise flux flow and of an amplitude sufficient to saturate legs II and III. These legs will remain saturated after the termination of the pulse since remanent and saturated inductions are almost equal. Consider now the effect of an alternating current flowing through the winding 23 and tending to cause flux to flow around the small hole 13 through legs II and III. Current of a phase or direction to produce clockwise flux flow will produce no flux change in either adjacent to hole 13 because leg III is saturated and no further flux can flow through it. Similarly, current in the direction tending to produce counter-clockwise flux will produce no flux change since leg II is already saturated in that direction. It follows, therefore, that there will be no output signal induced into the winding 25 by the alternating current flowing through winding 23 and no energy will flow to the output load 27; the transfluxor is "blocked"—a condition represented by the flux states in the shaded region around hole 13 of the transfluxor in Figure 2C.

Figure 2D:
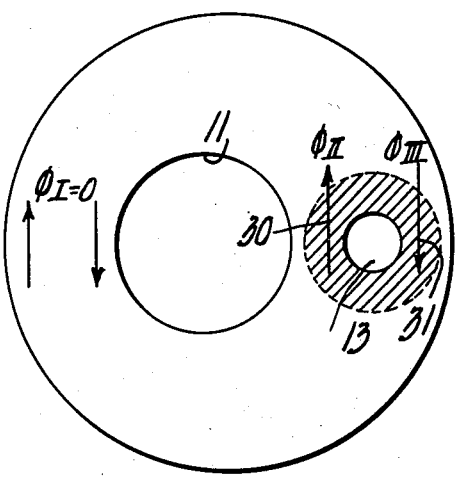

Assume that a pulse of current is sent through the winding 29 of a polarity tending to produce a counter-clockwise flow of flux through leg II. Flux can not flow through leg III which is saturated but can flow through leg I. The necessary continuity of flux flow will be satisfied by an interchange of flux betwen legs I and III which will leave leg I with zero flux and leg II with "upward" saturation. In this condition, the alternating current through winding 23 tending to produce flux flow around the small hole 13 will, in fact, produce such a flow. The first counter-clockwise phase of the alternating current through winding 23 will reverse the flux. The next clockwise phase will reverse it again and so on indefinitely. An alternating current will be induced in the winding 25 and current will flow in the output load 27. This corresponds to an "unblocked" condition of the transfluxor; the "unblocked" condition is illustrated by the shaded region around hole 13 in Figure 2D where it is seen that the flux lines 30 and 31 respectively flow in a clockwise direction around hole 13.

The transfluxor can also be operated in a half-tone mode; that is, it can be set to any condition between blocked and unblocked in a continuous range in response to the amplitude of a single setting pulse. Once set, it will produce indefinitely an output proportional to the setting. The half-tone operation of the transfluxor may be described as follows: Consider first the transfluxor shown in Figure 2A in its blocked condition. Let a setting pulse be provided through the winding 30 so that the current due to the setting pulse passes through the large hole 11; the setting pulse should be of such direction that it produces a flux opposing that produced by the blocking pulse which is sent through winding 21. A magnetizing force proportional to the setting pulse current is produced around the large hole 11. This force, or field H, is greatest at the periphery of the large hole 11 and diminishes with distance. With a circular aperture, this force is inversely proportional to the radius, therefore, for a given selected amplitude of the setting pulse current there will be a critical circle separating an inner zone where the magnetizing force is larger than the threshold magnetic force $H_c$ which is required to overcome or reverse the existing sense of magnetization, and an outer zone where this force is smaller than the threshold magnetizing force. A priming pulse applied to leg II can change only that part of the flux which is directly upward, namely that part which has been set or "trapped" into leg II by the setting pulse. This flux flows through leg III which is closer to leg II than leg I, and where an equal amount of flux change is produced. A driving pulse producing a downward magnetization of leg III will saturate that leg and retransfer the trapped amount of flux back to leg II. A succession of alternate priming and driving pulses will cause interchange between legs II and III to an amount of flux just equal to that initially set into leg II.

The use of cell techniques and hysteretic switching and storage techniques in discrete picture elements in a mural image reproducer according to the present invention provides a purely "solid state" television image reproducer requiring no cumbersome large vacuum envelope. This makes feasible an image reproducer in the form of a "picture frame" which is hung on the wall and which is energized by a relatively small image signal receiver and driving system. Also, there is no distortion due to nonlinear scanning; the picture is always as sharp as there is no focussing, and is geometrically perfectly reproduced.

The mode of operation described in connection with the transfluxor shown in Figure 2A has illustrated how a two-apertured transfluxor can be used for switching, storage and control. It is possible to use a single transfluxor of this type for each elemental light producing area of a mural image reproducer of the present invention. The precise method of switching and control using a single transfluxor will be described in detail with respect to the mural image reproducer which is shown in Figure 9.

*A two-transfluxor control unit*

Figure 3A:
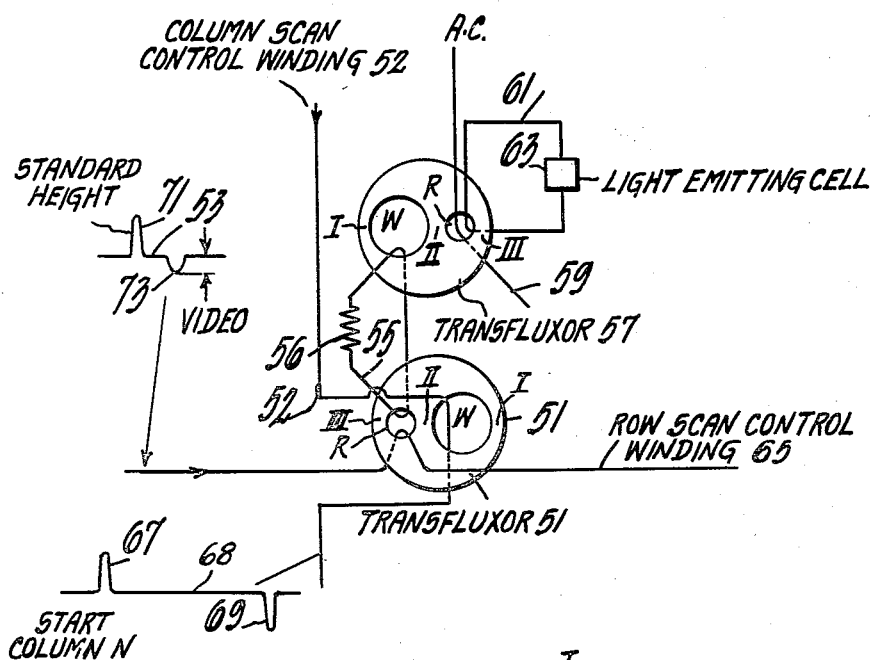
Figure 3A shows a two-transfluxor switching and control circuit.

An alternative means of providing the control functions which are so uniquely applicable for use in the present invention is the two-transfluxor device unit shown in Figure 3A. It follows from the discussion in connection with the mural image reproducer 2 shown in Figure 1 that at any one instant, one row or one column of the array being scanned, carries the switching and image or pattern information signals to the exclusion of all other rows and columns. The coincidence of these signals and the magnitude of the information relating to image or pattern characteristics of an intersecting cell of the array may be recognized by the two-transfluxor control unit of the type shown in Figure 3A.

The transfluxor 51 has two apertures R and W and three legs bearing the designators I, II, and III. A row scan control winding 65 links the window R of the transfluxor 51. A coupling winding 55 links the aperture R of the transfluxor 51 with the aperture W of the transfluxor 57, utilizing a series resistor 56. This resistance insures that the current through aperture W of transfluxor 57 will be proportional to the voltage, developed at aperture R of transfluxor 51, rather than its integral. Coupled to the aperture R of transfluxor 57 are the alternating current source winding 59 and the coupling loop 61 to an output load such as a light emitting cell 63.

The transfluxor 51 also has the column scan control winding 52 passing through the aperture W. The signal 68 consisting of a positive pulse 67 followed by a negative pulse 69 is passed through the column scan control winding 52. An asymetric pulse 53 consisting of a large positive pulse 71 followed by a small negative pulse 73 is applied to scan control winding 65.

Figure 3B:
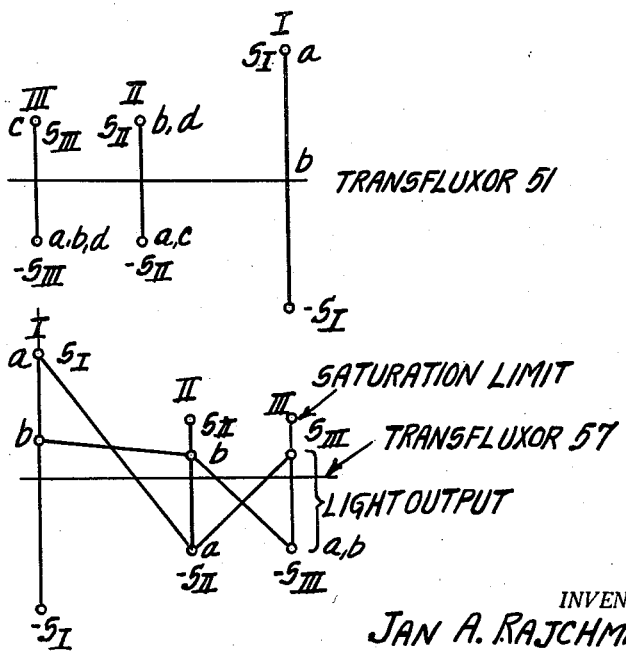
Figure 3B shows flux diagrams associated with the two-transfluxor switching and control circuit shown in Figure 5A.

Initially, transfluxor 51 is set to a blocked state illustrated by the points "$a$" on the diagram of Figure 3B which constitutes a diagram of the remanent flux states of the three legs I, II, and III in the transfluxor. Points $S_I$, $-S_I$, $S_{II}$, $-S_{II}$, $S_{III}$, $-S_{III}$ indicate saturation limits for the respective legs. In this state described by points "$a$," legs II and III of the transfluxor 51 are in opposite senses as viewed from window R. Consequently the transfluxor is blocked and insensitive to pulses supplied by the row scan control winding 65. When a positive pulse 67 is supplied to the scan control winding 52, transfluxor 51 is set to the state described by the points "$b$" shown in Figure 3B; in this state leg II changed its direction of remanence and leg I has lost a corresponding amount of flux. This row scan control winding 65 is energized now by a selected pair of pulses constituting the asymmetric pulse 53. The pulse 71 is positive and of fixed amplitude while the other pulse 73 is negative and of amplitude proportional to the video signal or dependent on the video signal at that instant. The positive pulse through window R establishes the state described by points "$c$" for transfluxor 51, which are illustrated in Figure 3B. This state causes a current to be induced in the coupling winding 55 linking the aperture R of the transfluxor with the aperture W of the transfluxor 57 of a magnitude controlled by resistor 56. This current sets aperture W of transfluxor 57 to the state described by points "$a$" shown in Fig. 3B. This is the reset state or blocked state. The negative pulse 73 as supplied through the aperture R of the transfluxor 51 by the row scan control winding 65 is assumed to have a minimum amplitude sufficient to reset transfluxor 51 to the state which is the same as the state described by points "$d$" shown in Figure 3B. This negative pulse 73 is designed to have the same area as the positive pulse 71 by an appropriate control of its width; therefore, the smaller the amplitude of the pulse 73, the longer must be its duration. The flux through legs II and I adjoining the aperture W of transfluxor 57 will be set to some state such as that described by points "$b$" in Figure 3B depending upon the value of the current through the aperture R of transfluxor 51. It, therefore, follows that the amount of flux excursion around the aperture R of transfluxor 57 is precisely set by the flux state of the aperture W which is controlled by the video signal. The A.-C. drive through the aperture R of the transfluxor 57 will now produce continuous light output from the light emitting cell 63 according to the amount of flux set between points "b" and $-S_{III}$ shown in the flux diagram of transfluxor 57 for leg III in Figure 3B. This amount of flux is proportional to the instantaneous value of the video at the instant of scanning.

The use, per picture element, of two transfluxors as a single control unit instead of the use of one transfluxor control unit to be described in the system of Figure 5 has some advantages. Two windings are required in the apertures R and only one in the apertures W. The smaller number of windings per aperture is simpler to fabricate.

The transmission of the video signal through the row scan control winding 65 rather than the column scan control winding 52 is possible and may be more or less of an advantage depending upon the type of transfluxor and the type of material used in the transfluxors.

*A mural image reproducer using two-transfluxor control units*

Figure 4 shows a transhysteretic-device-controlled mural image reproducer system for television, which utilizes a two transfluxor unit of the type shown in Figure 3A, with each light element. This system provides a mural image reproducer 75 according to the present invention for displaying monochrome pictures with halftones. Each element 73 of the mural image reproducer 75 is a switching element consisting of two transfluxors, as shown in Fig. 3A, which controls the light output from a light element at the element. As has been previously mentioned in the specification, these cells are in an array. Typically the array may have 525 horizontal lines and 700 vertical lines, for convenience, only a few of the rows and columns are illustrated in Figure 4. The operation of the circuit shown in Fig. 4 is as follows: a shift signal generator 77, synchronized with the incoming video produces a train of pulses. The frequency of these pulses is at picture element frequency with the period of each pulse constituting the horizontal scan time divided by the number of vertical lines. The train of pulses produced by the shift signal generator 77 activates a column counter 79 which is a coventional binary counter with an appropriate reset to count in cycles of 700 since this number is a non-integral power of 2. The stages of the column counter 79 activate, through the amplifiers 81, the input lines of a column selector circuit 7. This embodiment of the column selector circuit 7 is described in detail in the copending application by the present inventor and bearing the title "Magnetic Switching Device" and the U.S. Serial No. 339,861. Each of the binary inputs are in pairs; each side linking half of cores 87 with the other side of the other half. The linking sides, usually a single turn are all in series and are represented in Figure 4 by the 45° dashes over the cores.

The cores 87 each consist of a toroidal core made of low coercive force magnetic material having suitable magnetic characteristics, i.e., a rectangular hysteresis loop. The cores may mave any desired shape but the toroidal shape is preferred. For the purpose of simplification of the drawing shown in Figure 4, the cores are represented as elongated rectangles. A number of selecting coils $C_1$ through $C_8$ are coupled to the cores 87 in a desired coded fashion. Each selecting coil consists of a number of windings which are wound on the cores and which are connected in series in a manner previously described. The selected coils are arranged in pairs and the code of the coupling is a binary one. The first pair of selecting coils $C_1$ and $C_2$ are coupled to alternative halves of the cores; a second pair of selecting coils $C_3$ and $C_4$ are coupled to alternate quarters of the cores; the third pair of the selecting pair of the selecting coils $C_5$ and $C_6$ are coupled to alternate eighths of the cores and so on. Each selecting coil is driven by a vacuum tube associated therewith with the coil serving as the load for the tube. The tubes are actually examples of a switch which can be utilized to turn the current in the selecting coil on and off.

Current is sent through each selecting coil in such a direction as to tend to saturate the core in the direction of its initially set normal remanence, for example, N where N and P represent two possible states of remanence; that is, normal and abnormal states. It is obvious that one and only one core has non-inhibited currents for any combination of the inputs at any one time. As the input signals provided to the selecting coils change according to the binary counter, the identity of the non-inhibited core moves from core to core linearly across the set of cores. If all the cores are excited, either with a pulse at each counter with this pulse in such a direction as to magnetize the cores toward a state termed P. then the one non-inhibited core will actually change direction of saturation and produce a voltage in the output winding. It is seen, therefore, that the vertical lines of the array are excited with pulses of voltage one-after-another in rapid succession thereby producing horizontal scanning.

In like fashion, an array of cores 91 are associated with row counter 93 which drives the selecting coils of the row selector circuit 6 through the array of tubes 95. These cores control the row selector circuit 6 and function in a manner described in connection with the core array 87. The row selector circuit 6, however, includes the winding 97 to which is applied the video signal. The winding 97 is coupled to all cores by serially connected windings in a sense tending to magnetize the cores toward state P. The windings of all the selecting coils have the same sense, providing magnetomotive forces in an N-going direction. Thus, in this embodiment of the invention, the instantaneous strength of the video signal will control the saturation or desaturation of the selected non-inhibited core and therefore provides instantaneous control to the energy applied to successive rows by the row selector circuit 6.

At the end of the horizontal scan the column counter 79 produces a pulse which advances by one count, the row counter 93. Thus the identity of the non-inhibited core is not only moved successively along the columns but the identity of another non-inhibited core is also transferred down from row to row to complete the entire scanning action of the image raster.

The row selector circuit 6 can also be of a type slightly different from the column selector circuit 7. For example, at each position of the switch there may be utilized a pair of cores which have the more usual Z type hysteresis curve rather than a rectangular one. Here again all pairs of inputs are energized as before and so all pairs of cores are biased off by the selecting input circuits except one and that one progresses along the row with the binary counts. The non-inhibited pair of cores are not saturated and are essentially at the origin of the B—H plane and consequently have relatively high permeability. The video signal is applied to all cores of the switch but appears only in the output of the one pair which is not inhibited, that is, saturated. The purpose of a set of cores rather than a single one at each position is to minimize the switching transient due to "turning the pair on" or "turning the pair off."

The discussion in connection with the circuit shown in Figure 4 has shown how transfluxors may be keyed with row and column scanning information in addition to instantaneous video signal information to be set so as to provide continuous light output proportional to the video information from each of the elemental areas to accomplish the reconstruction of an image or pattern. One transfluxor unit, 73, of the two-transfluxor type shown in Figure 3A, is located at each elemental area of the mural image reproducer 75 in Figure 4. This transfluxor unit 73 provides control of the energy reaching the light element 63 responsive to the row, column and elemental area image information; the energy for driving the light element 63 is provided through the A.C. winding 59.

The row and column selector circuits 6 and 7 shown in Figure 4 have demonstrated one method of transmitting the correct video information to the corresponding elemental area of the mural television screen, in conjunction with the transfluxor which, in turn, controls the light output from each area.

*A magnetic shift register for use with mural image reproducers*

Another form of row and column selector circuit employs a magnetic shift register of the type described by Rajchman, Briggs, and Lo in their copending applications bearing the U.S. Serial No. 511,916, now Patent Nos. 2,803,812, issued Aug. 20, 1957 and 512,056, now abandoned. The magnetic shift register for switching both row and column information, utilizing the circuits to be described in detail, provides a switching circuits of unusual reliability and positive action. Consider first the operation of the magnetic shift register shown in Figure 5. This magnetic shift register shown in Figure 5 provides the function of switching each transfluxor along a row.

A discussion of the switching process associated with a single row of a mural television magnetic switching system will serve as an introduction to the switching process of the entire mural image reproducer shown in Figure 9 where each of the rows will, in turn, be controlled by a row magnetic shift register. In this mural image reproducer, only one transfluxor at each element, is utilized.

The magnetic shift register shown in Figure 5 is utilized to key on each column of transfluxors; this magnetic shift register will be utilized to select each column of transfluxors in succession by providing a current pulse of fixed amplitude through the selected column bringing the element transfluxor to a threshold above which it is capable of accepting the video information. The magnetic shift register shown in Figure 5 includes a series of magnetic cores 151, 152, 153 and 154 each of which is at remanence either a normal state (N state) and in an abnormal state (P state). The bus 157 passes respectively through cores 151 and 153 and is coupled to ground by way of the resistor 159. The bus 161 passes through, respectively, the cores 152 and 154 and is coupled to ground by way of resistor 163.

Consider the operation of core 152 at the time when all other cores 151, 153 and 154 are in the normal state and core 152 is in an abnormal state. Let the current pulse 165 be sent through the bus 161. This current passes through core 152 which is thereupon switched from the abnormal state to the normal state. A current $I_1$ is thereupon produced in the winding 167 which is coupled to core 152; this current $I_1$ is caused to flow through the diode 169 and to pass through the coupling loop 171 in a manner whereby core 153 is switched from normal to abnormal state.

The switching of core 152 also produces a voltage in the winding 173. No current results from this voltage because of the blocking diode 175 so that the preceding core 151 is not affected. This blocking action of diode 175 is due to the bias on bus 161 due to the voltage developed across resistance 163, by the current pulse 165.

The switching of core 153 from normal state to abnormal state in a manner previously mentioned produces a voltage in the winding 177. This voltage does not produce any current in the winding 177 because of diode 179 so that it does not dampen the switching of core 152.

It thereupon follows that the application of the current pulse 165 at a time when all cores but core 152 are in normal state, produces the action of switching the core 152 to the normal state and core 153 to the abnormal state. If a current pulse 181 is applied a short time after current pulse 165, and is caused to pass through the core 153 by way of the bus 157, core 153 will then be switched from abnormal state back to normal state with this switching action causing core 154 to be switched from normal to abnormal state. With the application of current pulses 181 and 165 sent alternately through the two buses 157 and 161, the cores are successively switched from normal to abnormal state and back to normal according to the switching action described in the following table wherein core 151 is referred to as core I, core 152 is referred to as core II, and so on:

| Time | Core I | Core II | Core III | Core IV | Core V | Core VI |
|---|---|---|---|---|---|---|
| $T_1$ | P | N | N | N | N | N |
| $T_2$ | N | P | N | N | N | N |
| $T_3$ | N | N | P | N | N | N |
| $T_4$ | N | N | N | P | N | N |
| $T_5$ | N | N | N | N | P | N |
| $T_6$ | N | N | N | N | N | P |

At $T_1$, core 151 is switched on to start the sequence; at $T_2$ the current pulse 165 is produced; at $T_3$ the current pulse 181 is produced, and so on. The table shows the switching of each core from normal to abnormal state and then back to normal state. The switching action progresses from core to core in the magnetic shift register at a rate and sequence prescribed by the timing of the current pulses 165 and 181.

Consider again the action of core 152; this time with respect to its controlling the transfluxor 185. When the current $I_1$ is produced in the winding 167 causing core 153 to switch from normal to abnormal state, the current $I_1$ passes through the transfluxor hole 187 of the transfluxor 185 with a magnitude necessary to bring that transfluxor to its "threshold of setting."

Figure 6:
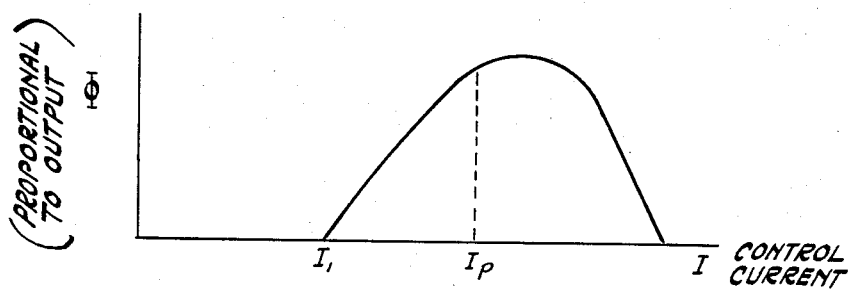
Figure 6 shows a transfluxor control characteristic curve.

The "threshold of setting" of the transfluxor 185 can be explained by considering the diagram shown in Figure 6. This diagram relates the flux $\Phi$ set in the inner leg of the transfluxor as a function of the current pulse I through the large hole 187. Figure 6 represents the modulation characteristic of the transfluxor. The current from the core 152 obtained in the manner previously described, is chosen to have an amplitude equal to the threshold $I_1$ of the characteristic and is not of sufficient amplitude to cause any setting of the transfluxor. Video information is then provided in the form of additional current pulses in the range from $I_1$ to $I_p$ through the hole 187 to an extent depending upon the video information relating to that cell. Thus the video current pulse sets the flux $\Phi$ proportionally to its amplitude.

Figure 5 shows each of the element transfluxors coupled to an electroluminescent cell 191. During the scanning of a row as represented in the circuit shown in Figure 7, the magnetic shift register is utilized to select each element transfluxor along the row in sequence at a rate corresponding to the row scanning rate.

Figure 7:
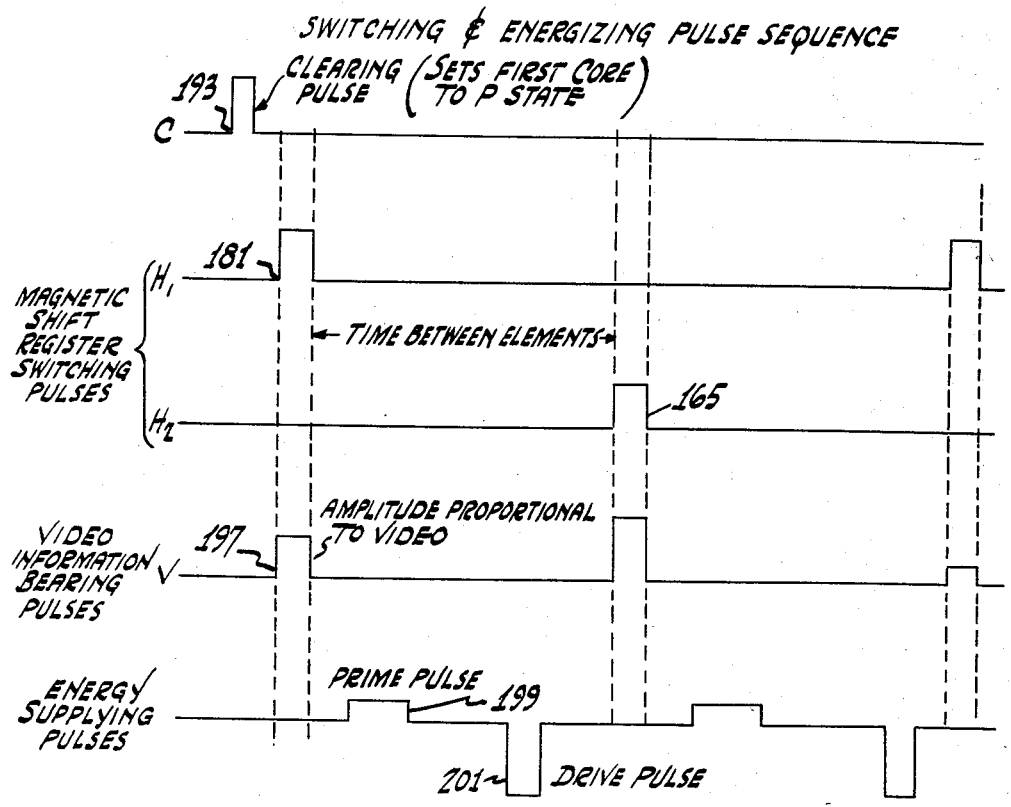
Figure 7 shows the switching and energizing pulse sequence utilized with the magnetic shift register, of Figure 5.

The energizing and switching of the element transfluxors shown in Figure 5 may be accomplished in response to the pulse sequence illustrated in Figure 7; this is only one of the many possible pulse sequences. At the start of excitation of each line, a clear pulse C193 passes thru each of the element transfluxors and clears or blocks all of the transfluxors of the row; its function is to remove any stored settings and to set each transfluxor into a state wherein no output is produced. The clear pulse C193 also passes through the core 151 to set this core in the abnormal state P.

The actuation of core 151 by the clear pulse C193 results in the shifting of core 151 from the normal state to the abnormal state thereby adjusting the transfluxor 195 to its "threshold of setting." It is to be noted that core 151 need not necessarily be attached to a transfluxor but may be an extra core, utilized to receive the clearing pulse C193 for the starting of the shifting operation. The timing of the clear pulse should bear relationship to the retrace time involved between row scansions. The magnetic shift register will respond to a sequence of pulses 181 and 165 until the final core is reached; the magnetic shift register will then be in a condition wherein all of its cores are in the normal state for a time corresponding to the retrace time, or slightly less, after which time the clear pulse C193 is produced which causes the magnetic shift register to be responsive to the pulses 165 and 181.

Clear pulse C193 actuates core 151. Upon application of the pulse 181 to core 151, core 152 is caused to be switched to the abnormal state with core 151 returning to the normal state. The switching of core 152 to the abnormal state also brings the transfluxor 185 to its "threshold of setting" in a manner previously described.

If core 151 is coupled to a transfluxor 195 which controls the first electroluminescent cell 191, then the pulse 181 should follow the clear pulse C193 by the time difference existing between the required excitation of the sucessive electroluminescent cells. If the transfluxor 195 coupled to core 151 is not coupled to an electroluminescent cell, then the operation of switching on each of the electroluminescent cells by the magnetic shift register is timed with respect to the required timing of excitation of the electroluminescent cell to which the video information is first applied. In one type of circuit it would be advantageous for the first few magnetic cores to operate into dummy loads in order to insure correct starting of the magnetic shift register.

Pulses 165 and 181 cause the advancement of the switching operation along the series of cores utilized in the magnetic shift register. The pulses 197 describe the amplitude of the video information at the time each of the switching pulses are produced and are passed into the transfluxor array so that the video information bearing pulse for the electroluminescent cell 191, for example, will occur at a time coincident with the pulse 181 which activates the core 151 which adjusts the transfluxor to its "threshold of setting."

The electroluminescent-cell-energizing energy is not necessarily applied to the transfluxor at the same time that the video information bearing pulse is applied to the transfluxor. Energizing pulses of the type shown in Figure 7 may be utilized. These energizing pulses are provided by an interlaced pair of trains of pulses. In between the pulses 181 and 165 shown in Figure 7, a priming pulse 199 is produced which sets the direction of the flux in the output leg of the transfluxor to the opposite direction of flux from that when the transfluxor was blocked. A driving pulse 201 is then applied; the polarity of this driving pulse is in the opposite direction with respect to the polarity of the prime pulse 199.

The frequency of the prime and driving pulses need not be at the frequency at which the pulses 165 and 181 are produced.

Figure 8:
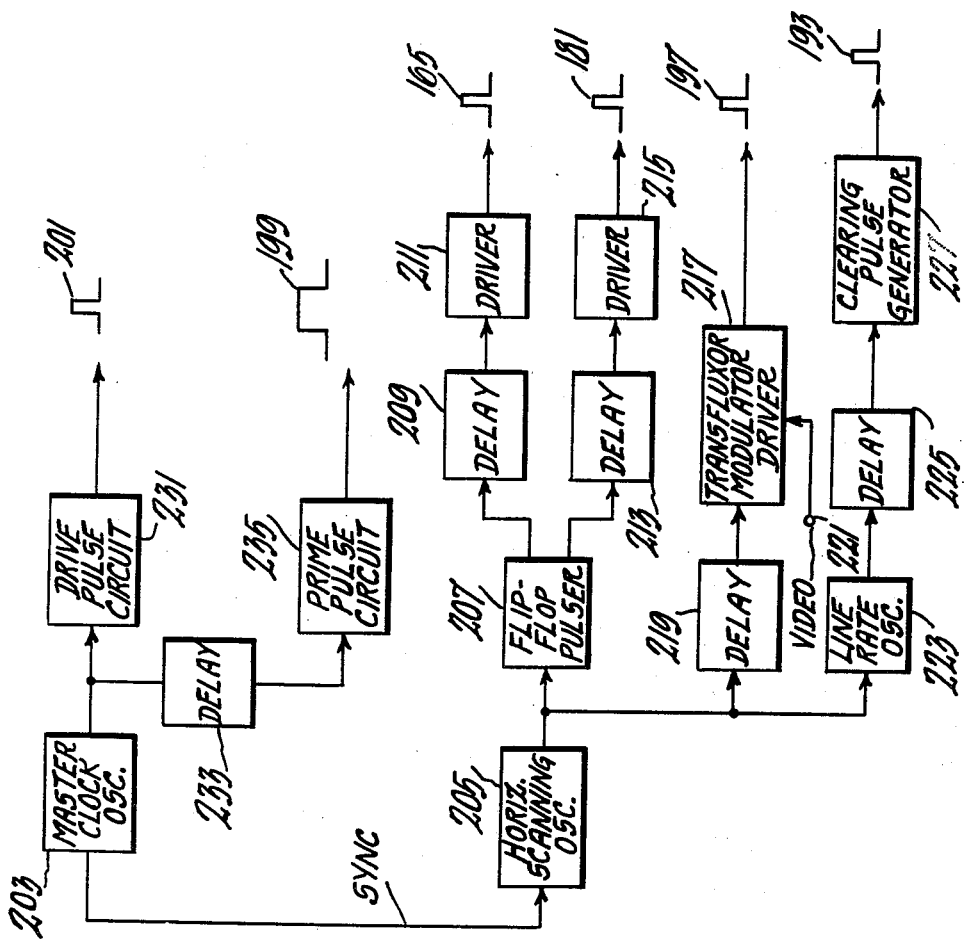
Figure 8 shows the block diagram of the control circuits which supply control pulses to the circuit shown in Figure 5.

An illustrative circuit for producing the pulses described in Figure 7 is shown in block diagram in Figure 8. Here a master clock oscillator 203 provides a master frequency signal. The master clock oscillator 203 then drives the horizontal scanning oscillator 205 which in turn drives the flip-flop pulser 207. The output of the flip-flop pulser 207 is utilized to drive respectively the delay line 209 and driver for the pulses 165, and the delay line 213 and the driver 215 for the pulses 181.

The horizontal scanning oscillator 205 also drives the transfluxor modulator driver 217, utilizing the delay line 219 to properly delay the video information bearing pulses 197. The video modulation which modulates amplitude or energy of these pulses is applied to the input terminal 221.

The horizontal scanning oscillator 205 also drives the row scanning line or rate oscillator 223 which, by way of delay line 225, drives the clearing pulse generator 227 with the delay line 225 set to provide the proper timing of the clearing pulse C193 at the start of the scanning of the row.

The master clock oscillator 203 also drives the drive pulse circuit 231 which produces the drive pulse 201 and by way of the delay line 233 the prime pulse circuit 235 which produces prime pulse 199.

It follows from the circuit shown in Figure 8 that a row scanning action may be controlled with accuracy and with positive action in that the timing of one or more of the controlling pulses may be subject to control by the master clock oscillator 203.

The circuit shown in Figure 5 illustrates one method of utilizing a magnetic shift register and transfluxor control action to supply video information to each of the elemental light producing cells of a row in a mural type image reproducer system. In a true mural image reproducing system, a multiplicity of rows may be utilized with the total number of rows bearing prescribed relationship to the lines which are utilized to the transmission of the video information. In addition, the number of elemental areas along each row must be in accord with the image definition required of the image reproducer and with the aspect ratio which is characteristic of the transmitted image.

*A mural image reproducer system using one transfluxor per element*

Figure 9 shows a schematic diagram of a mural television image reproducer utilizing only one transfluxor per element and magnetic shift registers for energizing each transfluxor.

The column magnetic shift register 250 successively imparts switching information to each column starting with the first column and continuing until the last column is reached. In Figure 9, the first column is situated under the numeral 251 and the last column is situated under the numeral 252. The column magnetic shift register 250 operates according to the principles described in connection with the magnetic shift register shown in Figure 5. The successively generated pulses 181 and 165 are applied to the array of cores in the column magnetic shift register 250 and the transfluxor threshold current is then induced successively in, for example, the bus 253 which passes through each of the transfluxors in the first bus 251 followed by the threshold current which is induced through the bus 255 which passes through each of the transfluxors in a second column 252 and so on. The resistor 259 is a simulated load for the last core 261. The column magnetic shift register 250 shown in Figure 9 differs from the circuit shrown in Figure 5 in that the horizontal synchronizing pulse passes through the core 263 switching it to the abnormal state and starts the column scanning process.

The column magnetic shift register 250 successively passes a "threshold of setting" pulse through each of the columns of the mural image reproducer 308. The row magnetic shift register 290 selects the row being scanned and imparts video information to this row.

The row magnetic shift register 290 performs the function of commutatively distributing the video signal to the rows. To accomplish the function, the row magnetic shift register 290 uses transfluxors rather than cores. The circuit diagram of the row magnetic shift register 290 (described in the copending application by Rajchman, Briggs and Lo entitled "Electric Control Systems" bearing the U.S. Serial No. 511,916) represents one embodiment of this circuit; its operation and functions may be described in the following fashion. A pair of trains of row scan advance pulses $V_1 291$ and $V_2 292$ are formed in a circuit similar to the circuit utilized for generating the pulses 165 and 181. These row scan advance pulses are generated alternately at a rate and sequence conforming to the requirements of row selection of the mural image reproducer 308. The line 293 carrying the $V_1$ pulse 291 passes through the large hole 294 of the transfluxor 295, through the small hole 297 of the transfluxor 299, through the large hole 301 of the transfluxor 303, and so on. The line 300 carrying the $V_2$ pulse 292 is caused to pass through the small hole 305 of the transfluxor 295, through the large hole 307 of the transfluxor 299, through the small hole 309 of the transfluxor 303, and so on. The purpose of having the line passing through the large hole of one transfluxor and then through the small hole of the succeeding transfluxor rather than through the large holes of the alternate transfluxors in a manner similar to that employed in the column magnetic shift register 250 is to prevent the producing of undesirable flux conditions in the legs adjacent to the small apertures of the transfluxors adjacent to the transfluxor through whose large aperture the scan advance pulse is passed and which is caused to shift state as a result of the scan advance pulse.

A composite waveform of the type shown in Figure 10 illustrates the timing of the various pulses needed for application to the row magnetic shift register 290. The $V_1$ pulse 291 is separated in time from the $V_2$ pulse 292 by an amount of time sufficient to accommodate the pulse series including the prime pulses 310 and the sampled video pulses 312 of the row being scanned.

Consider the sequence of operation which causes the mural image reproducer 308 to operate subject to control by the row magnetic shift register 290. The vertical sync pulse is applied to the terminal 311. This vertical sync pulse shifts the transfluxor 295 to the abnormal state. It is noted that neither transfluxor 295 nor 299 is coupled to a row of the mural image reproducer 308. The $V_1$ pulse 291 switches transfluxor 299 to the abnormal state and transfluxor 295 back to the normal state. The $V_2$ pulse 299 then switches transfluxor 303 to the abnormal state with transfluxor 299 switched back to the normal state. During the $V_2$ pulse 292, current will then flow through the rectifier 315 to pass through each of the transfluxors constituting the first row 317. This current passing through the first row 317 will clear all of the transfluxors in that row to perform the function described in connection with the clearing pulse C utilized in the circuit shown in Figure 5. Shortly after the $V_2$ pulse 292 is applied, a prime pulse 316 is passed through all the transfluxors in the row magnetic shift register 290 using the line 314 which passes from the large hole to the small hole of any one transfluxor before passing on to the next hole. The prime pulse 316 reverses the flux direction in the output leg. The sampled video pulse 312 will thereupon pass by way of line 308 through the small hole 309 of transfluxor 303 and induce current through the rectifier 321 and through each of the transfluxors of the first row 317. The particular transfluxor in the first row 317 which is brought to the threshold of setting by a controlling signal from the column magnetic shift register 250, will be set. The prime pulse 310 and the sampled video pulse 312 are alternately applied to the row magnetic shift register 290 in the sequence shown in Figure 10 with the timing of the sampled video pulse 312 caused to be in proper coincidence with the pulses from the column magnetic shift register 250. Each of the transfluxors in the first row 317 will be set according to the video information. After the first row 317 has been scanned, a $V_1$ pulse 291 is applied which switches transfluxor 331 into an abnormal state and causes the transfluxor 303 to develop a clearing current which passes through the rectifier 333 and through each of the transfluxors in the second scanning line 335 via the interstage winding 355.

The prime pulse 310 and the sampled video pulse 312 then cause the transfluxor 331 to apply properly timed sampled video information to the second row 335. The scanning operation previously described is repeated until each of the rows has had video information applied to each of its transfluxors. In an interlaced television system the rows will be sampled in the sequence 1, 3, 5 . . . followed by the sequence 2, 4, . . . as is employed in a normal television scanning system.

Note that when any transfluxors in the row magnetic shift register 290 are in the normal state there is no response to the video and prime pulses in the horizontal line or row associated with that transfluxor; only when the transfluxor has been switched into the abnormal state, is the condition set up whereby the transfluxor is responsive to the prime and sampled video pulses.

The row shift register 290 is provided with two cores 351 and 353 which remedy possible malfunction of the register due to imperfect saturation characteristics of the magnetic material of the transfluxors. When the advance pulse $V_1$ or $V_2$ is applied to a transfluxor in the normal state, there is actually a voltage induced in the interstage winding 355, due to the elastic reversible change of flux on the driven transfluxor. With sufficiently imperfect saturation characteristic and large ratio of turns of some windings, this reversible change of flux on the transfluxor driven by the advance pulse could produce an irreversible change of flux in the next transfluxor coupled to it. These irreversible flux changes could commulate with successive advance pulses, so that the transfluxor could be erroneously set to the abnormal condition. This possible malfunction is prevented by absorbing the reversible flux in the cores 351 and 353 which are made of material with rectangular hysteresis loop characteristics. The core 353 will absorb any induced voltage during $V_1$ pulse 291 which could cause a flux change in transfluxor 331. The line 300 passes the $V_2$ pulse through the magnetic core 353 which returns the magnetic core 353 back to its original state. In like fashion, currents caused to pass through the magnetic core 351 during the $V_2$ pulse 292 when the clear current passes through the diode 315, will be absorbed in the magnetic core 351. The line 293 which passes through the magnetic core 351 will pass the $V_1$ pulse 291 through this core in a manner whereby the state of the magnetic core will be returned to the state which it occupied before the $V_2$ pulse 292 was applied.

The magnetic core 371 will absorb pulse induced voltage during the video pulses 312 which would tend to "set up" improper flux conditions in the transfluxors of the rows in array which are not selected. The prime pulse is caused to pass through the winding 373 which also passes through the magnetic core 371 in a manner which returns the magnetic core to the state it was in prior to the application of the video pulse.

Rectifiers 321 are in the video information bearing line which are connected in opposite direction from the rectifiers which pass the clearing pulses. These rectifiers 321 are necessary to prevent the clearing pulse from being dampened by the video information bearing circuits. In like manner, the clearing pulse circuit is thereby also prevented from dampening the video information bearing circuit.

The mural image reproducer 308, shown in Figure 9, shows only a small number of the total number of elements required for a television system which can reproduce all of the video information with full detail corresponding to a 525 line picture. It is recognized, however, that the number of rows and columns and the number of switching sequences in both the horizontal and vertical magnetic shift registers may be increased without detracting from the teachings of the present invention.

The details of construction of the transfluxors utilized in the circuit in Figure 9 are provided as follows: each transfluxor at a picture element is made up of two stacked units each composed of RCA Laboratory material No. 302 which consists of .3MgO, .3MnO, and .4F$_2$O$_3$. Each unit of the transfluxor is .140 inch thick. The overall diameter is .346". The diameter of the large hole is .138". The diameter of the small hole is .043". The center of the large hole is located .017" from the center and the small hole is .1125" off center in the other direction.

Typically, the number of turns utilized with the magnetic cores of the column magnetic shift register 250 are as follows: the winding through which the advance pulses are passed utilizes 30 turns. The winding coupled to the diode of the preceding core utilizes 5 turns; the winding coupled to the diode leading to the next core utilizes 30 turns.

With respect to the transfluxors at each picture element, the winding accommodating the signal from the column shift register utilizes 2 turns. The clear pulse is passed through a winding of 5 turns. The video pulse is passed through a winding of one turn. The prime pulse is passed through a winding of 3 turns. The drive pulse is passed through a winding of one turn. The output winding to the electroluminescent cell utilizes 17 turns.

In the row magnetic shift register, the blocking current winding through each transfluxor utilizes 3 turns. The priming pulse winding utilizes 3 turns. The winding coupling the video pulse to each transfluxor utilizes 10 turns. The output winding coupling the video information to each horizontal line utilizes 20 turns. The winding through which the V pulses 291 and 292 are passed each consist of 30 turns.

Each electroluminescent cell is ⅜" square with 7/16 of an inch spacing utilized between corresponding edges of adjacent electroluminescent cells. The material used is ZnSiCu. The electroluminescent cell material is mixed in an araldite dielectric layer 1.5 x 10$^{-3}$ inches thick. The rear electrode consists of deposited silver. The front electrode is made up of transparent glass coating.

*A mural image reproducer using three-aperture transfluxors*

Another form of the present invention involves the use of a three aperture transfluxor at each picture element in the mural image reproducer for both vertical and horizontal signal coincidence detection and half-tone setting. A three aperture transfluxor provides direct control by "geometrical" transfer of flux rather than depending upon electrical linkages between the coincident detecting and half-tone setting elements as was in the case of the circuit shown in Figure 4.

Consider the transfluxor 400 shown in Figure 11A. This transfluxor 400 has three apertures V, H and L, and 4 legs I, II, III, and IV. In the case of the transfluxor 400 shown in Figure 11A, the legs II, III, and IV are of equal area while cross-sectional area of leg I taken along the axis through the centers of apertures V, H and L is designed to be equal to or more than the sum of areas of cross-sectional legs II, III and IV. The V aperture is energized by current through the conductor 401. The H aperture is energized by current through the conductor 403 and the L aperture is energized by the current through the conductor 405. An output loop 407 couples aperture L to an output load which, in the case of a mural image reproducer, would be a light producing cell. A mural image reproducer circuit utilizing a three hole transfluxor is shown in Figure 12. Here, utilizing, for example, the row and column selector circuits of the type described in connection with Figure 4, the row and column signals are provided through appropriate conductors from the row and column selector circuits 6 and 7 to the respective holes of the transfluxor 400. The video information in this circuit is applied to the column selector circuit 7; energizing alternating current is passed through the winding 405. An electroluminescent cell 409 is coupled to the conductor 405 utilizing the flux linkage from the aperture L; the electroluminescent cell 409 is caused to give off light in accordance with the amount of video information provided to the winding 403 which threads the aperture H of that transfluxor.

One method of operation of the transfluxor 400 shown in Figure 12 utilizes the application of switching signals of the type shown in Figure 11C. The row scan sequence consists of producing, previous to the start of the column scan, the positive pulse 415 followed by the weaker negative pulse 417. The positive pulse passes through the line 401 and saturates all legs II, III, and IV in the negative direction. This saturation is shown on the diagram in Figure 11B where the flux states corresponding to legs I, II, III, and IV are shown with the points $S_I$, $S_{II}$, $S_{III}$, and $S_{IV}$ denoting respectively the levels of positive saturation with $-S_{II}$, $-S_{III}$, and $-S_{IV}$ denoting levels of negative saturation. The positive pulse 415 brings leg I to the level $S_I$ and saturates legs II, III, and IV negatively. The letter $q$ is utilized to signify the levels of saturation resulting from the generation of the positive pulse 415. It is to be noted that the positive flux return is through leg I which is not necessarily saturated. The state of saturation of all the legs, signified by $q$ is a state by which all the previous flux settings are wiped out on all the transfluxors on a particular row. The negative pulse 417 through the aperture V is of intensity sufficient to produce reversible magneto-motive force only around the aperture V, that is, to produce a flux change between legs I and II. This negative pulse 417 will set the transfluxor 400 to the state corresponding to the letter $r$ in Figure 11B in which leg II is saturated positively and leg I has lost a corresponding amount of flux while legs III and IV remain the same as in state $q$.

The column scan starts after the elapse of the pulses 415 and 417 through the V apertures. The column scan consists of applying pulses of amplitude controlled by the instantaneous video signal, through the H aperture by way of the line 403. These pulses are always of the same polarity, e.g., positive. The video information bearing pulses are shown in Figure 11C in the form of, for example, the pulses 421, 423 and 425.

A pulse through the aperture H will tend to unsaturate legs II and III. Using the polarity of the pulse shown in Figure 11C, the positive H pulse produces a counterclockwise magneto-motive force tending to lower the flux in leg II and to raise it in leg III. The current in the positive H pulse is of finite intensity depending upon the video signal so that only part of the total possible flux excursion will be produced. The flux in legs II and III will then be set to a state illustrated by this state bearing the letter "$s$" in Figure 11B. Leg III has now been set according to the instantaneous value of video.

A power-producing alternating current or train of pulses is applied continuously to all apertures L. This will have the effect of causing flux to be interchanged back and forth between legs III and IV in accordance with the amount of flux trapped in leg III. Thus states $s$ and $v$ will alternate indefinitely producing a corresponding alternating current in the output which is coupled to leg IV.

At the end of the horizontal scan, a blocking positive pulse 431 will produce a pulse of magneto-motive force sufficient only to surround the V aperture. This will cause legs I and II to shift from the states $s$ and $v$ to the state $w$ shown in Figure 11B. All H apertures in the transfluxor on that particular line are now blocked as far as any possible change of flux due to a counterclockwise magneto-motive force through the H apertures themselves is concerned. For example, consider some aperture H in a transfluxor on a given column in a row which is not being scanned and let there exist the "in the blocked" condition of state $v$ in leg II. Leg III can be in any state depending upon the particular phase of alternating current (for example, state $q$, $r$, $v$, or $s$). No counterclockwise change of flux around the aperture H is possible, no matter what state leg III is in since leg II is saturated negatively in state $W$. Consequently the setting of an aperture H on the scanned line has no effect at all on all other H apertures on the same vertical line.

The frequency of the alternating current of the repetition rate of the pulse through the L apertures is arbitrary since it has been shown that leg III can be in any state with the saturation of leg II "blocking" any setting of the H aperture. However, the alternating current or the pulse could be synchronous with the video information bearing pulses in the form of, for example, a train of pulses. The non-selected H aperture on a vertical line would always be energized in a standard state, that is, the state $w$ for leg II and states $q$, $r$ and $v$ for leg III. In many cases, it is more practical to utilize a non-synchronous drive.

The output from the L aperture into leg IV will remain now as set during an entire frame period. During the scanning of the next row, the column conductor through all of the V holes, resets all flux to state $q$ shown in Figure 11B. The new cycle due to the horizontal scan then recommences.

In this arrangement, the logic of coincidence-recognition, as well as the storage of video information, are obtained entirely by "geometrical" flux transfer. When the fabrication of many cell elements in a single plate is contemplated, the use of a three aperture transfluxor is particularly convenient in that no power is lost because of electrical linkages.

Returning to the circuit shown in Figure 12, pulses from a synchronized pulser 435 are used to advance the column counter 441 to produce column scanning. The column selector circuit 7 has one core per position, e.g. the core 439 is coupled to the line 403 which is coupled to the transfluxor 400. All cores are greatly excited in the negative saturation state with the exception of the core being scanned. On that core there are no inhibiting selecting currents. The identity of this selected core moves along from core to core due to the action of the column counter 441. The cores are also excited by the video signal by a proper D.-C. bias current as well as a positive keying pulse derived from the synchronized pulser 435. The positive keying pulse reverses the sense of magnetization of the selected core, while not altering all other cores which are strongly inhibited, at a rate which depends on the instantaneous value of the video signal. This keying pulse sets a particular transfluxor H aperture on the column linked to the selected core in the column selector circuit 7, according to the video signal, in the manner previously described.

At the end of the column scan, the column counter 441 produces a pulse set 449 which advances the row counter 447 by one position. This pulse set, produced by the pulse shaper 451 consists of a pair of keying pulses, a strong positive pulse followed by a weak negative pulse; this pulse set is transmitted to the row corresponding to the particular column. The blocking pulse 431 required at the end of the row scan on, for example, line N, may be obtained simultaneously with the resetting of line $N+1$ by the expedient of coupling each horizontal electrical line in the mural image reproducer 448 to two cores of the row selector circuit 6.

*Matching the transfluxor to the electroluminescent cell*

Having described a plurality of embodiments of the present invention wherein video information may be switched into elemental light producing areas on a mural image reproducer, consider at this point some aspects of an electroluminescent source of light which is controlled by a transfluxor. When an electric field is applied across some phosphors, light is produced. The light increases with the third to fifth power of the voltage in the range of greatest interest. The light output also increases with frequency when an alternating current drive is used. The increase is approximately linear up to the region of 20 kc.; at nearly 1 mc. the light output levels off. The efficiency of light production from present day electroluminescent cells is lower at the higher frequencies; also there is an optimum thickness for producing the most light. The electroluminescent cell, whose fundamental concepts have been described earlier in this specification behaves essentially as a capacity. Its resistive component is negligible; typically, a cell having an area of 1 $cm.^2$ produces satisfactory light for television applications when energized at 100 kc. with 100 ma. and 300 v. (R.M.S.). These values show that the cell is a high impedance device compared with the transfluxor with which it is to be driven. Typically when the output leg of a transfluxor is about .040″ wide and the transfluxor is .140″ high and made of a practical ferrite for which a rectangular hysteretic loop is characteristic, about 1 v. per turn is obtained at 1 mc. for a drive of 3 ampere turns. Because hysteretic materials have relatively large coercive force, the magnetizing current of 3 ampere turns required in this high voltage output would represent a power of 3 watts per element which is obviously impractical when the neighborhood of ½ million elements are involved. This large magnetizing current may be greatly reduced by putting more than 1 electrical turn on the aperture of the transfluxor, that is, to use transformer action.

A transformer can be used to match the impedance of the transfluxor and the electroluminescent cell. Figure 13 shows the case when the L aperture of a three hole transfluxor 400 is coupled to the transformer 461 to drive the electroluminescent cell 409.

Figure 14 shows a three-aperture transfluxor 400 wherein an autotransformer 463 is utilized to match the impedance of the transfluxor and the electroluminescent cell 409.

Figure 15 shows the use of a resonant circuit involving the inductance 411 as employed in the circuit shown in Figure 12 wherein means are provided for causing a large current to pass through the electroluminescent cell 409 in virtue of the resonance characteristic involving the inductance 411 and the capacitive electroluminescent cell 409.

In any of the cases shown in Figures 13, 14 and 15, the voltage across the electroluminescent cell 409 also appears on the winding of the transformer and the problems of obtaining sufficient flux change or number of turns remains as with the case of a thick transfluxor.

By using a sufficient number of turns coupling the L aperture to the electroluminescent cell, it is possible to obtain the voltage necessary to drive the electroluminescent cell with relatively little magnetic material. The loading of the transfluxor by the transformer can be made negligible so that the power required for driving the transformer can be reduced to that required by the transfluxor itself. This driving power can be reduced by utilizing thinner or smaller transfluxors.

Figure 16:
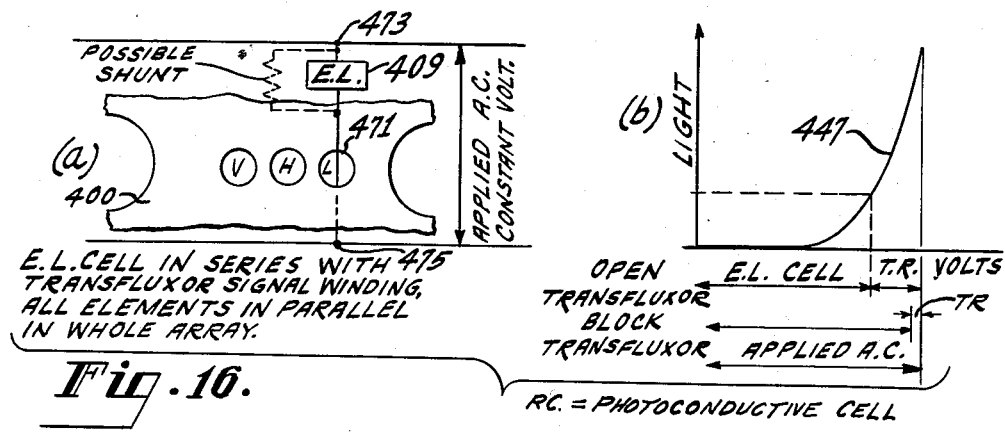
Figure 16A shows a three-hole transfluxor coupled to an electroluminescent cell which is placed in series with the output transfluxor winding.
Figure 16B shows the light output characteristic curve of the transfluxor of Figure 18A.

Another approach to the driving of the electroluminescent cell utilizes to advantage the rapid change of light with applied voltage. Consider an electroluminescent cell 409 in series with a winding 471 through the L aperture of the transfluxor 400 as shown in Figure 16A, with a fixed alternating current voltage applied across the terminals 473 and 475. When the transfluxor is blocked, practically no voltage can be developed across the winding 471; therefore, practically all of the alternating current voltage is developed across the electroluminescent cell 409 and a strong light output is obtained. When the flux state of the transfluxor is somewhere in the range between blocked and open, some voltage is developed across the winding 471 passing through the aperture L; therefore, less voltage is available across the electroluminescent cell 409. Since the light varies very rapidly with small changes of voltage at the relatively high voltage region, considerable light variation is obtained for a very small variation of voltage due to the action of the transfluxor. This change in light variation is illustrated by the curve 477 shown in Figure 16B. Because the current between the electroluminescent cell 409 is too small to produce the magnetizing current required for transfluxor action with a single turn winding, a shunt resistance or capacity may be used. In the system shown in Figure 16A, the high voltage on the electroluminescent cell 409 is not derived from the transfluxor; the transfluxor subtracts or adds a controlled small amount of voltage at the region of high sensitivity of light to voltage as shown in the Figure 16B.

Figure 17:
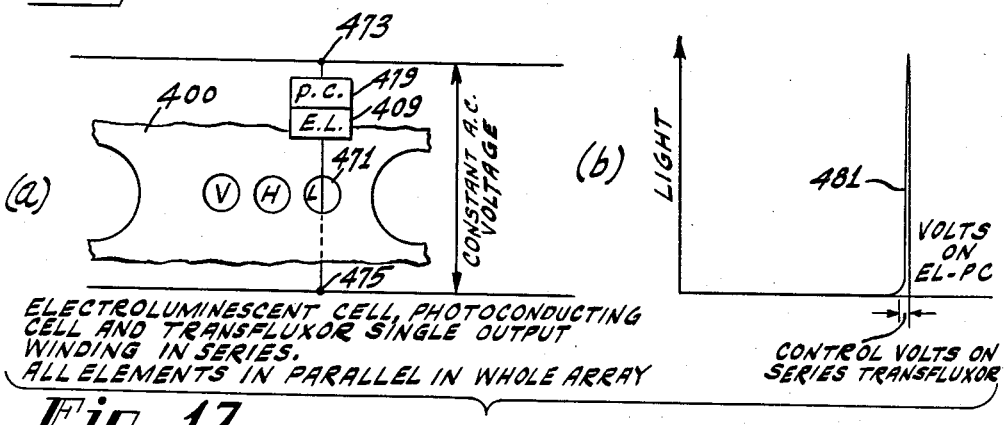
Figure 17A shows a transfluxor circuit utilizing a photoconducting cell for positive feedback due to light.
Figure 17B shows a light output characteristic curve representative of the circuit shown in Figure 19A.

The light vs. voltage characteristic of a transfluxor-electroluminescent cell unit can be made to be even steeper, that is, the light output will depend on very slight changes of voltage, when positive light feedback is used. Consider the arrangement of an electroluminescent cell 409 in series with a photoconductive cell 479 as shown in Figure 17A; this combination of the photoconducting cell and the electroluminescent cell is coupled in series with the transfluxor 400 across the alternating current voltage supplied at the terminals 473 and 475. As the transfluxor is blocked, more voltage appears across the electroluminescent cell and more light is thereupon produced. The increase in light reduces the resistance of the photoconducting cell which in turn causes more voltage to appear on the electroluminescent cell. This positive light feedback can be made stable with appropriate adjustments of gain to provide the curve 481 relating light output as a function of the control voltage across the electroluminescent cell 409 which is connected in series with the photoconducting cell 479.

Figure 18:
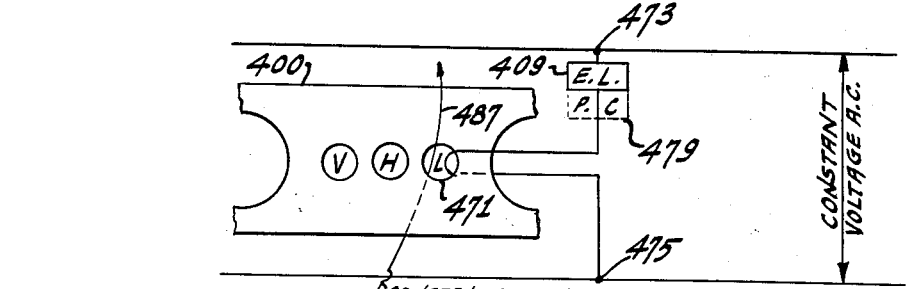
Figure 18 shows a three-hole transfluxor which employs a pair of output-hole energizing windings.

Another important arrangement of driving the electroluminescent cell 409 is the combination of the previous methods which is illustrated in Figure 18. The transfluxor aperture L accommodates two windings, a primary winding 487 through which passes an alternating current of constant amplitude, and a secondary winding 471 which is in series with an electroluminescent cell 409. Since the current through the electroluminescent cell is negligible compared with that required of the transfluxor 400, the transfluxor 400 can be caused to be operated unloaded. The transfluxor provides a voltage which adds or subtracts to the alternating current voltage on the electroluminescent cell 409. The alternating current voltage applied through the winding 487 is in the nature of the alternating current biasing voltage.

*A color television mural image reproducer using transfluxors*

The present invention may be utilized to display color images by utilizing elemental areas of electroluminescent cells which provide light at required primary colors. For example, if each of the horizontal scanning lines of the previously described mural image reproducer circuits were to consist of a line including electroluminescent cells for providing light output at each of three component colors, say red, green and blue, video information corresponding to each of the component colors, provided to the correct elemental electroluminescent cell area at proper time, would provide a picture in full color.

Figure 19:
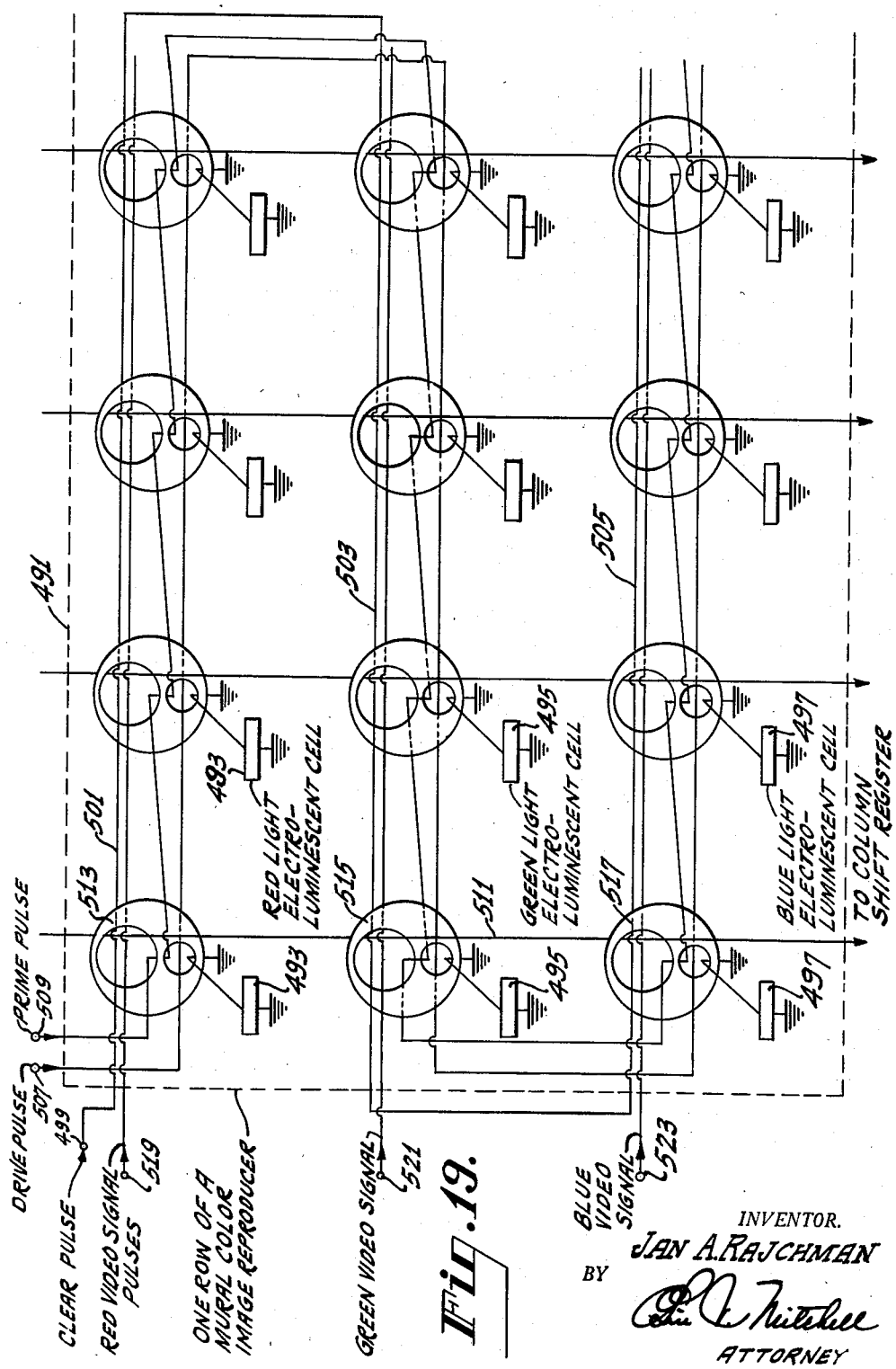
Figure 19 shows a sectional detail of a mural color image reproducer.

Figure 19 shows the detail of one section of a line of a mural color image reproducer. This section is boxed in the dotted line bearing the number 491. This line of the mural color image reproducer actually consists of three lines. One line supplies energizing information to the red light electroluminescent cells 493; one line supplies energizing information to the green light electroluminescent cells 495; and one line supplies energizing information to the blue light electroluminescent cells 497. Each of the lines describing color information relating to one of the component colors, functions in the same manner as the horizontal lines shown in Figure 9. It is noted that in the circuit in Figure 19, however, the clear pulse may be applied to the terminal 449 which is coupled simultaneously to the lines 501, 503, and 507 which pass through each of the component transfluxors and each component color line. In like manner, the drive pulse and prime pulse which are applied to the terminals 507 and 509 respectively may be utilized to simultaneously energize each of the three component color scanning lines making up the one line of the mural color image reproducer. The energizing lines from the horizontal shift register may be caused to pass simultaneously through each of the transfluxors aligned along a particular vertical line of the transfluxors array. The line 511, for example, passes through transfluxors 513, 515 and 517. The television signal receiver operating in conjunction with the mural color image reproducer must demodulate an incoming color television signal and produce color information relating to each of the component colors. In the case of the circuit shown in Figure 19, the red video signal, in the form of pulses bearing video information at times coincident with the energizing of each of the vertical lines, is applied to the input terminal 519 and caused to pass through the transfluxors which control the red light electroluminescent cell 493. In like fashion, pulses providing green video signal information and blue video signal information are applied respectively to the input terminals 521 and 523 to energize the series of transfluxors which are coupled to the electroluminescent cells having corresponding component light output.

The circuit in Figure 19 has shown each of the control transfluxors which control the light output from a trio of component color light emitting electroluminescent cells as exactly arrayed on a vertical line. It is to be appreciated, however, that these transfluxors with their associated electroluminescent cells may be staggered according to a prescribed orientation and may be sequentially energized from transfluxor to transfluxor or may be arranged and energized to accomplish line sequential representation of color information, that is, one entire color component line in a total line would be energized followed by the successive energizing and scanning of the other two component color lines.

Figure 20:
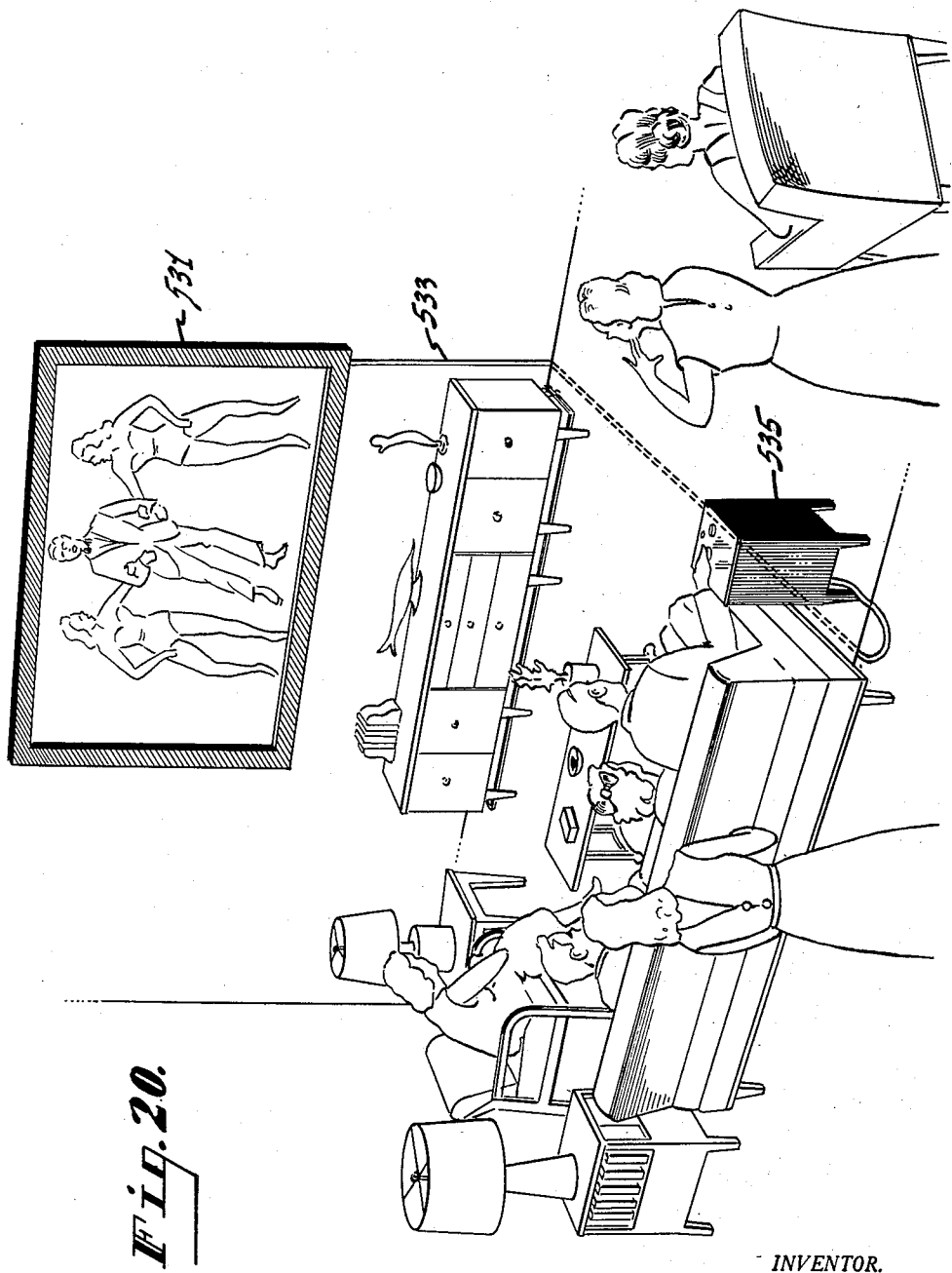
Figure 20 shows an illustration of how a mural image reproducer may be utilized in the living room of a modern home.

Figure 20 shows one form of the present invention illustrating how a mural image reproducer might be utilized in the livingroom of a modern home. It is noted that the mural image reproducer 531 is a flat large image display device which is hung at an appropriate position on a wall, in much the same manner as a favorite painting. The mural image reproducer 531 is flat. Its control cable 533 is coupled in turn to a remotely located control box 535 which would be utilized to adjust the television channel received and the contrast and brightness of the reproduced image.

*Concerning the conversion of electric energy into light*

The preceding description has discussed the employment of electroluminescent cells for converting electric energy into luminescence. It is to be appreciated, however, that other methods of conversion of electrical energy into control or production of light are possible. Several of these methods involve the use of:

(A) The quenching effect of an electric field on certain ultra-violet light excited electroluminescent bodies;

(B) Incandescent lights;

(C) Heat quenching on ultra-violet light excited phosphors;

(D) Phosphors which may be excited with ratio-active materials and then selectively heat quenched by use of elemental-area driving devices;

(E) Mechanical motion of a mechanical light valve —for example, flat aluminum flakes suspended in oil can block light transmission when oriented by an electric field so that the flakes are perpendicular to the light while good light transmission prevails when the electric field orients the particles along the light rays;

(F) Mechanical motion of a macroscopic nature— for example, flaps in a metal sheet which can be moved in an electric static or magnetic forces.

(G) Gas discharge tubes.

*Uses of the present invention in other than television*

It is also to be appreciated that the present invention has utility in a far broader field than for television image reproduction. Display devices according to the present invention may be used for many types of image or pattern displays. Some of these applications can be found in the:

(A) field of radar information representation and storage;

(B) P.P.I. Radar Scanning information representation and storage;

(C) Computer display applications involving, for example, low resolution and high storage;

(D) Industrial television where, for example, for a coarse image involving a slow rate of scanning may be employed;

(E) The transmission of, for example, a newspaper page during each scan utilizing very low frequency scanning rates and the storage capabilities of the present invention;

(F) Stereoscopic representation where, for example, adjacent elemental areas may be caused to produce light in prescribed planes of polarization to correspond to a plurality of individual images of a stereoscopic image, with suitable viewing means such as polaroid glasses then utilized for the reconstruction of the stereoscopic image;

(G) A "z" axis or "3D" array of elements where the elemental light emitting areas are installed in more than one plane;

(H) An image reproducer where half-tone reproduction is not desired, only "on-off" control at each elemental area. This may be accomplished by adjusting what was previously described as the video-information-bearing pulse between either of two levels corresponding to the "on" or "off" position of the light emitting area. Other methods involving mechanism for blocking or unblocking the various transfluxors may be utilized.

(I) Illustration or pattern display devices wherein the rows and columns can be triggered or controlled according to any desired pattern or sequence to produce light patterns in a manner differing from television scanning procedures.

A mural image reproducer according to the present invention has certain structural advantages; for example, the image reproducing surface may be thin but not necessarily flat. This image reproducing surface may be constructed in accordance with any contour or geometrical surface which is most suitable for the type of image or pattern to be reproduced. The present invention is also uniquely suited for radar applications where the image reproducing surface is substantially circular and wherein one scanning path is in a radial direction and a second scanning path is in azimuthal direction. The present invention may also be utilized in radar utilizing an essentially circular pattern reproducing area wherein the elemental light reproducing areas are aligned in a long spiral path starting from the center and ending at the outer periphery to form a scanning path which does not involve both rows and columns but what is actually a very long row.

It is to be appreciated that the mural image reproducer according to the present invention may be operated in conjunction with many of several types of signals different and distinct from a standard television signal. A signal of any desired nature may be produced by a suitable signal producing device provided that such a signal causes the mural image reproducer to be responsive to at least signals indicating where light is to be produced and signals indicating how much light is involved at elemental areas.

Mural image reproducers according to the present invention are particularly suitable for use in movie houses or theatres where the mural image reproducer of the present invention would take the place of a conventional movie screen, either in black-and-white or in color, and in standard picture aspect ratio or wide screen such as is employed for Cinemascope, Vista-Vision or Cinerama. One method of operating such a mural image reproducer in, for example, a movie theatre, will utilize tape recordings of the image to be reproduced including the synchronizing signals which are required to form the image. The tape recording is installed on a suitable pickup and utilized to drive the mural image reproducer, utilizing proper electrical circuits. It follows that the use of tape recordings in conjunction with the mural image reproducer according to the present invention, has distinct advantages over the use of movie film particularly due to the fact that the tape may be used, erased and used again as many times as it is required.

Having described the invention, what is claimed is:

1. An image display system adapted to receive image information signals comprising, a row of light emitting means, a plurality of magnetizable material means each having a substantial remanence and a plurality of flux paths and directly connected to selected light emitting means, means for applying said information signals in a selected order to each of said magnetizable material means for producing a flux state indicative of the image information corresponding to the location of that light emitting means in said row, and means for producing various degrees of light output from each light emitting means corresponding to the flux state of the corresponding magnetizable material means.

2. A display device for producing an image comprising a plurality of light emitting elements, a like plurality of transhysteretic devices each one of which is directly connected to a different one of said plurality of light emitting elements, a first set of non-intersecting conductors one each of which is coupled to one of said devices, a second set of non-intersecting conductors, one each of which is also coupled to one of said devices, means for sequentially applying control signals to the conductors of said first set and additional means for sequentially applying control signals to the conductors of said second set whereby the coincidence of said first and second control signals produces sequential setting of each transhysteretic device, means for utilizing said settings to control the light output of each of said light emitting elements.

3. An image display system for producing a luminous display in accordance with image information signals, comprising a first set of rows of conductors and a second set of columns of conductors arrayed so that each conductor of said second set contiguously intersects each conductor of said first set, means for applying said information signals in a selected order to the intersections of the conductors of said first and second sets, magnetizable material means having a substantial remanence and a plurality of flux paths and directly connected to each intersection of said first and second sets for producing a flux state representative of the image information corresponding to that intersection, and light emitting means directly connected to each magnetizable material means for producing light output bearing relationship to the flux state of the corresponding magnetizable material means.

4. In combination, an electrical display device for producing a luminous display in accordance with image information signals comprising, an array of electroluminescent elements, means for developing a first set of signals representative of the location of each element, means for developing a second set of signals indicative of light output to be displayed at each element, a magnetizable means having substantial remanence and a plurality of flux paths and directly connected to each of said elements, and means for applying said first and second set of signals to said magnetizable means for determining the light output of each of said elements.

5. In an image reproducing system adapted to receive an intelligence signal indicative of an image to be reproduced, in combination, a mural image reproducer having a multiplicity of controllable-light-output light-emitting elemental areas, means for generating a first set of signals indicative of the location of each of said multiplicity of light-emitting elemental areas along a first direction of alignment of said elemental areas, means for generating a second set of signals indicative of the location of each of said multiplicity of light-emitting elemental areas along a second direction of alignment of said elemental areas, means for deriving an information signal from said intelligence signal indicative of the image information corresponding to each elemental light-emitting area, a plurality of transfluxor switching and control devices each directly connected to a different one of said elemental areas, means to apply one signal of said first set and one signal from said second set of signals to each of said transfluxor devices, and means to couple said information signal to said transfluxor devices for adjusting the light output of said light-emitting elemental areas in accordance with said coincidence of selected signals and the image information from said information signal set corresponding to the location of said elemental areas.

6. In an image reproducing system adapted to receive an intelligence signal indicative of an image to be reproduced, in combination, a mural image reproducer having a multiplicity of light-emitting elemental areas whose light output is controllable, means for generating a first set of signals indicative of the location of each of said multiplicity of light-emitting elemental areas along a first direction of alignment of said elemental areas, means for generating a second set of signals indicative of the location of each of said multiplicity of light-emitting elemental areas along a second direction of alignment of said elemental areas, means for deriving an information signal set from said intelligence signal indicative of the image information corresponding to each elemental light-emitting area, a plurality of magnetizable switching and halftone control devices each having a plurality of flux paths and directly connected to one of said elemental areas, means to apply said first and second sets of signals and said information signal set to said control devices for causing said control devices to adjust the light output of said light-emitting elemental areas in accordance with the image information from said information signal set corresponding to the location of said elemental areas when signals of said first and second sets of signals and said information signal set are in coincidence.

7. In a television image reproducing system adapted to receive a televison signal indicative of an image, the combination of, a mural image reproducer having a plurality of column conductors and row conductors, means for applying switching signals to points at the intersections of said row conductors and column conductors, means for developing image information signals corresponding to each of said points from said television signal, magnetizable material at each point having the characteristic of having a substantially rectangular hysteresis loop at remanence and having a plurality of closed flux paths in said material, certain portions of said paths being common to each other, means for coupling said information signals and said switching signals to the magnetizable material at each point to control the saturation flux intensity in at least one of said paths in accordance with the image information corresponding to that point, and light producing area means coupled to said magnetizable material for producing light output in accordance with the image information corresponding to said saturation flux intensity.

8. In combination, a controllable light source, a source of information signal, a magnetizable material with substantial remanence having a plurality of flux paths, certain portions of said paths being in common to each other, means for coupling said information signal source to said magnetizable material to control the remanence flux intensity in at least one of said paths in accordance with said information signal, and means directly connecting said light source to said magnetizable material to produce a light output having various degrees of intensity in accordance with variations in said remanent flux intensity.

9. In a televison image reproducing system adapted to receive a television signal indicative of an image, the combination of, a mural image reproducer having elemental light controlling areas arrayed in rows and columns, means for developing image information signals from said television signal indicative of the light output to be displayed at each elemental light controlling area in said array, a plurality of transfluxors each in direct connection with a different one of said elemental light controlling areas for controlling the light output of each elemental light controlling area, means for applying switching signals to each of said transfluxors in a prescribed switching sequence for storing image information signals at each of said transfluxors corresponding to the row and column in which that transfluxor is located and for controlling the light output of the corresponding elemental light controlling area.

10. An image display system for producing a luminous display in accordance with image information signals comprising, an array of electroluminescent light producing areas, means for developing a first set of signals indicative of the location of each electroluminescent area, means for developing a second set of signals also indicative of the location of each electroluminescent area but including image information corresponding to each electroluminescent area, a plurality of transfluxors each directly connected to a different one of said electroluminescent areas, means for applying said first and second set of signals to each transfluxor to store the image information corresponding to that electroluminescent area in connection with said transfluxor for any desired prescribed time interval and for adjusting the light output of that electroluminescent area in accordance with said stored image information.

11. A mural image reproducing system for producing a luminous display in accordance with image information signals comprising, an array of elemental light emitting areas each having a controllable light output, said array being in rows and columns, means for developing a first group of signals indicative of the image information corresponding to each elemental light emitting area, a plurality of magnetizable switching and control devices each having a plurality of flux paths and directly connected to an elemental area for controlling the light output of said elemental light emitting area, and having a threshold level which must be exceeded before light output is produced from said elemental light emitting area, means for developing a second group of signals indicative of the location of each elemental light emitting area, means for applying both said first and second set of signals to the control devices in each of said rows and columns for causing the coincidence of one of each of said first and second groups of signals to produce a signal for each of said control devices in excess of said threshold level, and means to adjust the light output from each elemental light emitting area in accordance with the image information corresponding to that elemental area.

12. A mural image reproducing system for producing a luminous display in accordance with image information signals comprising an array of elemental light emitting areas each having a controllable light output, said array being in rows and columns, means for developing a first group of signals indicative of the image information corresponding to each elemental light emitting area, a plurality of magnetizable switching and control devices each directly connected to a different elemental area so as to control the light output of said elemental light emitting area, and each device having a plurality of flux paths and a threshold level which must be exceeded before light output is produced from the elemental light emitting area in connection with said device, means for developing a second set of signals indicative of the location of each elemental light emitting area, a source of priming and driving pulses, means for applying said priming and driving pulses to each of said control devices, means for applying said first group of signals to the control devices according to rows and said second group of signals to the control devices according to columns, and means responsive to the coincidence of said first and second groups of signals at each intersection of the rows and columns to produce a control signal in each of said control devices in excess of said threshold level corresponding to the image information related to that intersection, and means to adjust the light output from each of said light emitting areas in accordance with the control signal produced by the control device in connection with said area.

13. A mural image reproducer system comprising in combination, a plurality of circuits for scanning elemental areas along each of a set of rows, means for developing signals representative of the image information at each elemental area, switching means for switching the corresponding signal to each point along each row in a prescribed sequence and timing, a plurality of transfluxors each directly connected to each elemental area and responsive to the image information signals to that point for producing a flux state representative of the image information corresponding to that elemental area, and light emitting means directly connected to each transfluxor for producing light output bearing prescribed relationship to the flux state of each transfluxor.

14. In an image reproducing system adapted to receive an intelligence signal indicative of an image to be reproduced, in combination, a plurality of line scanning systems each including means for scanning a plurality of elemental areas along a scanning line in a first direction at a first rate and timing, a switching means responsive to said intelligence signal for passing both elemental-area location signals and intelligence signals corresponding to each elemental area to each of said line scanning means in a prescribed sequence and timing, a plurality of magnetic switching and control means each directly connected to each elemental area in each line, means for applying said elemental area location signals and said intelligence signals to each magnetic switching and control means for developing in each magnetic switching and control means a flux state representative of the intelligence signal information corresponding to that point, and electroluminescent light reproducing means connected to each magnetic switching and control means for producing light output representative of said flux state.

15. An electrical display device for producing a luminous display in accordance with image information signals comprising, an array of magnetic material devices arrayed in rows and columns and wherein each magnetic material device has a plurality of apertures through which are linked a plurality of windings, means for developing a first set of signals representative of the location of each magnetic material device along a row, means for developing a second set of signals indicative of the location of each magnetic material device along a column, means for developing priming and driving signals, means for developing a third set of signals indicative of image information corresponding to the location of each of said magnetic material devices in said rows and columns, an array of light controlling elemental areas, means for coupling each of said light controlling elemental areas to one of said windings passing through a corresponding magnetic material device, means for coupling said first, second and third sets of signals to the second, third and fourth of said plurality of windings respectively linking each of said magnetic material devices, means for applying said priming and driving signals to at least a fifth of said plurality of windings linking each of said magnetic material devices, means responsive to said sets of signals to develop a flux state in each magnetic material device to store the image information corresponding to the location of that magnetic material device in said rows and columns and to adjust the light output of the corresponding elemental light controlling area according to said flux state.

16. In an image reproducing system adapted to receive an intelligence signal indicative of an image to be reproduced, in combination, a mural image reproducer having a multiplicity of light-emitting elemental areas whose light output is controllable, means for generating a first set of signals indicative of the location of each of said multiplicity of light emitting elemental areas along a first direction of alignment of said elemental areas, means for generating a second set of signals indicative of the location of each of said multiplicity of light-emitting elemental areas along a second direction of alignment of said elemental areas, means for deriving an information signal set from said intelligence signal indicative of the image information corresponding to each elemental light emitting area, a plurality of transhysteretic switching and control devices each directly connected to a different one of said elemental areas, means to apply said first and second sets of signals to said transhysteretic devices, and means to couple said information signal set deriving means to said transhysteretic devices for adjusting the light output of said light-emitting elemental areas in accordance with said coincidence of selected signals and the image information from said information signal set according to the location of said elemental areas.

17. An electrical display device for producing a luminous display in accordance with image information signals comprising, an array of columns and rows of magnetic material remanence-saturable devices each having a plurality of apertures through which are linked a plurality of windings, means for developing a first set of signals representative of the location of each magnetic material device along a row, means for developing a second set of signals indicative of the location of each magnetic material device along a column, means for developing energizing signals, means for developing a third set of signals indicative of image information corresponding to the location of each of said magnetic material devices in said rows and columns, an array of light controlling elemental areas, means for coupling each of said light controlling elemental areas to one of said windings passing through a corresponding magnetic material device, means for coupling said first, second and third sets of signals to a second, third and fourth of said plurality of windings respectively linking each of said magnetic material devices, means for applying said energizing signals to at least a fifth of said plurality of windings linking each of said magnetic material devices, means for adjusting the signal levels of said sets of signals to cause each magnetic material device to store the image information corresponding to the location of that magnetic material device in said rows and columns and to adjust the light output of the corresponding elemental light controlling area according to said image information.

18. In combination, in a color pattern image reproducing system adapted to provide component color information signals, the combination of, an array of elemental light emitting areas each having a controllable light output, selected emitting areas of said array emitting light characteristic of one of said component colors, means for developing a first set of signals representative of the location of each elemental area, means for developing a second set of signals indicative of at least the color of the light output to be displayed at each elemental area, a plurality of transfluxors each connected with a different one of said elemental areas, means for applying said first and second set of signals to each transfluxor for storing component color information for intervals of time, and means for applying energy according to said stored color information for controlling the light output of each elemental light emitting area.

19. In a color image reproducing system adapted to provide component color signals indicative of a color image to be reproduced, in combination, a mural image reproduced having a multiplicity of light emitting elemental areas each having a controllable light output, selected elemental areas adapted to provide light output having colors corresponding to each of said component colors, means for generating a first set of signals indicative of the location of each of said multiplicity of light emitting elemental areas along a first direction of alignment of said elemental areas, means for generating a plurality of signals indicative of both the location and the image information corresponding to each component color light emitting elemental area along a second direction of alignment of said elemental areas, a plurality of magnetic switching storage and control devices each connected to a different one of said elemental areas, means to apply said first set of signals and selected signals of said plurality of signals to each magnetic device for storage in such magnetic switching storage and control device of color image information corresponding to the color light emission characteristics of the elemental area connected with said magnetic device, and means for utilizing said magnetic devices for adjusting the light output of said elemental areas.

References Cited in the file of this patent

UNITED STATES PATENTS

| | | |
|---|---|---|
| 2,123,729 | Hunter | July 12, 1938 |
| 2,201,066 | Toulon | May 14, 1940 |
| 2,595,617 | Toulon | May 6, 1952 |
| 2,670,402 | Marks | Feb. 23, 1954 |
| 2,719,965 | Person | Oct. 4, 1955 |
| 2,803,812 | Rajchman et al. | Aug. 20, 1957 |

OTHER REFERENCES

Ser. No. 108,062, Toulon (A.P.C.), published May 6, 1952.